(12) United States Patent
Jinguji

(10) Patent No.: US 6,266,777 B1
(45) Date of Patent: Jul. 24, 2001

(54) INFORMATION PROCESSING APPARATUS TO CONTROL BUS LATENCY

(75) Inventor: Satoshi Jinguji, Yamanashi (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/226,919

(22) Filed: Jan. 5, 1999

(30) Foreign Application Priority Data

Jan. 5, 1998 (JP) .................................................. 10-000428

(51) Int. Cl.⁷ ...................................................... G06F 13/38
(52) U.S. Cl. ............................................. 713/400; 710/107
(58) Field of Search .................................. 710/107, 117, 710/126, 129, 130; 713/400

(56) References Cited

U.S. PATENT DOCUMENTS 4,412,286 * 10/1983 O'Dowd et al. ..................... 710/129
5,280,482 * 1/1994 Kitamura et al. .................... 370/458

FOREIGN PATENT DOCUMENTS 57-500445 3/1982 (JP) .
4-372043 12/1992 (JP) .

* cited by examiner

Primary Examiner—Thomas M. Heckler
(74) Attorney, Agent, or Firm—Sughrue, Mion, Zinn, Macpeak & Seas, PLLC

(57) ABSTRACT

An information processing apparatus of the present invention includes a bus having latency. A first element, which is provided on the information apparatus, sends out a request to the bus. The request includes information indicating a time that data corresponding to the request exists on the bus. The information apparatus has a second element which sends out the data to the bus at the time, and a third element which receives the request and identifies a time which the data exists on the bus. A fourth element, which is provided in the information apparatus, receives the data in accordance with a timing which the element identifies.

20 Claims, 22 Drawing Sheets

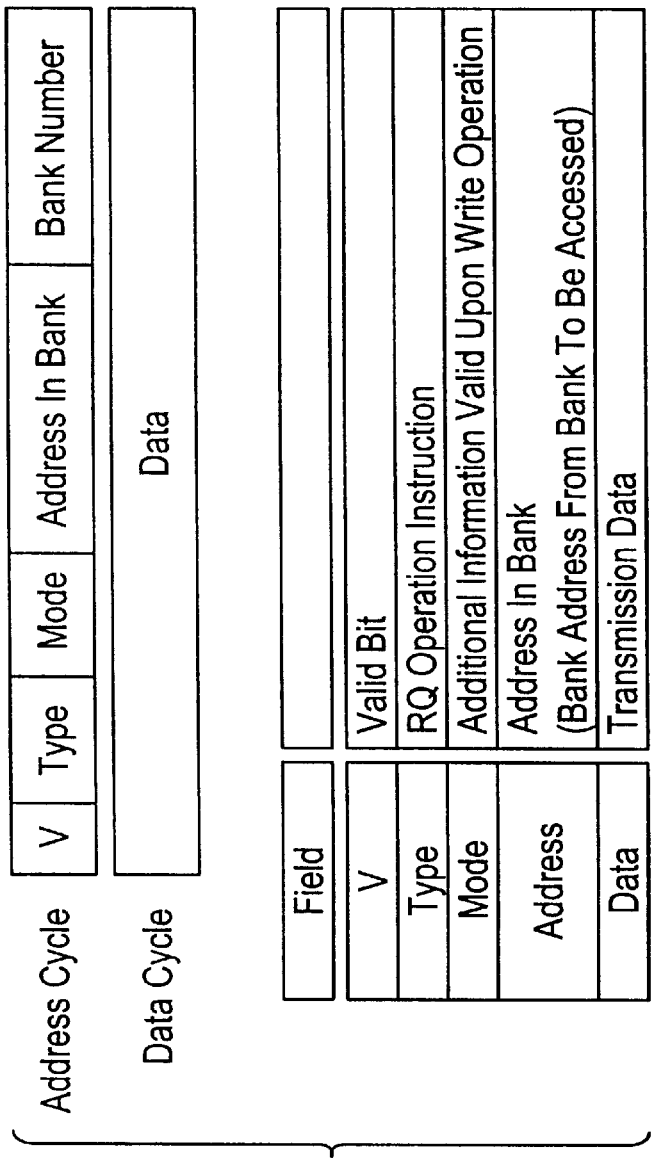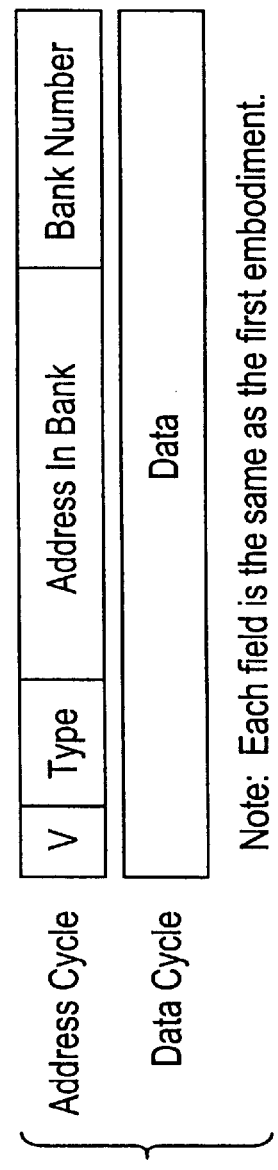
FIG. 6
FIG. 7
Note: Each field is the same as the first embodiment.

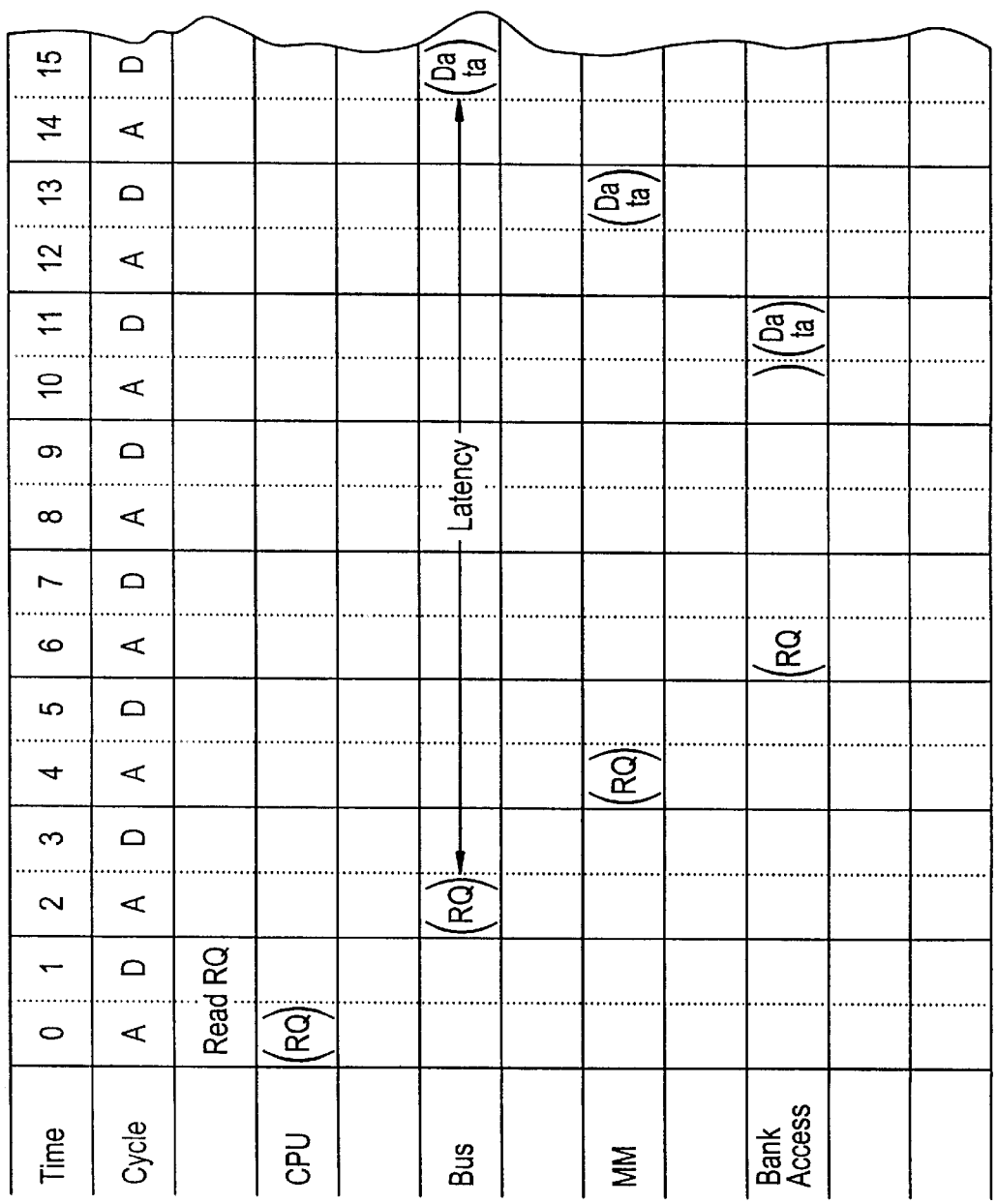

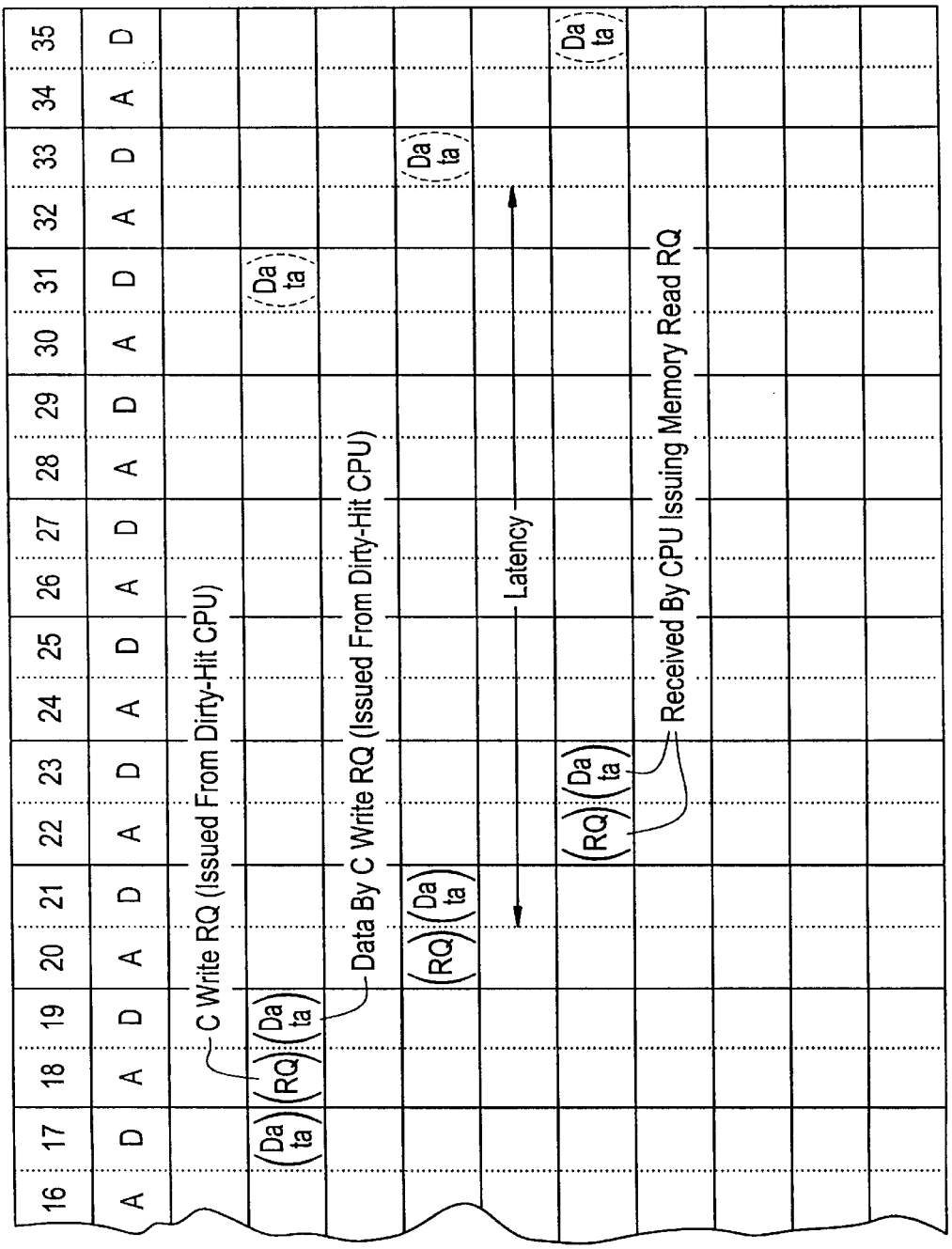

FIG. 11

| | Register Value At Time T | Register Value At Time T+1 |
|---|---|---|
| Entire Bus Timing | xxxxxx | 1xxxxx |

Note: In case when bus busy registration occurs by new read RQ, x means don't care.

FIG. 12

| | Register Value At Time T | Register Value At Time T+1 |
|---|---|---|
| Entire Bus Timing | xxxxx0 | 0xxxxx |
| | xxxx01 | 0xxxx1 |
| | xxx011 | 0xxx11 |
| | xx0111 | 0xx111 |
| | x01111 | 0x1111 |
| | 011111 | 011111 |
| | 111111 | 111111 |

Note: In case when bus busy registration occurs by new read RQ, x means don't care.

FIG. 13

| | Register Value At Time T | Mode |
|---|---|---|
| Entire Bus Timing | xxxxx0 | 000 |
| | xxxx01 | 001 |
| | xxx011 | 010 |
| | xx0111 | 011 |
| | x01111 | 100 |
| | 011111 | 101 |
| | 111111 | 110 |

FIG. 14

| Entire Bus Timing | Register Value At Time T | Register Value At Time T+1 | Remark |
|---|---|---|---|
| | xxxxxx | 1xxxxx | In case when bus busy registration occurs by new read RQ at time T+1; |
| | xxxxxx | 1xxxxx | If there is a valid data for PU, in which register is contained, or MM: upper |
| | | 0xxxxx | if there is no valid data for PU, in which register is contained, or MM: lower |

FIG. 15

| | Register Value At Time T | Register Value At Time T+1 | Remark |
|---|---|---|---|
| Entire Bus Timing | xxxxx0 | 0xxxxx | As for entire bus timing value, bus busy registration is done (1 is set) by new write RQ/C write RQ at time T, and 0 is set at the leftmost to indicate that there is no valid data in the latency. |
| Valid Timing | xxxxx0 | 0xxxxx | As for valid timing value, if there is valid data for a belonging PU or MM, bus busy registration is done (1 is set) at the same timing as the entire bus timing. |
| Same | xxxx01 | 0xxxx1 | |
| | xxxx0x | 0xxxx1 | |
| | xxx011 | 0xxx11 | |
| | xxx0xx | 0xxxxx | |
| | xx0111 | 0xx111 | |
| | xx0xxx | 0xxxxx | |
| | x01111 | 0x1111 | |
| | x0xxxx | 0xxxxx | |
| | 011111 | 011111 | |
| | 0xxxxx | 01xxxx | |
| | 111111 | 111111 | Indicates that valid data exists after latency |
| | xxxxxx | 1xxxxx | |

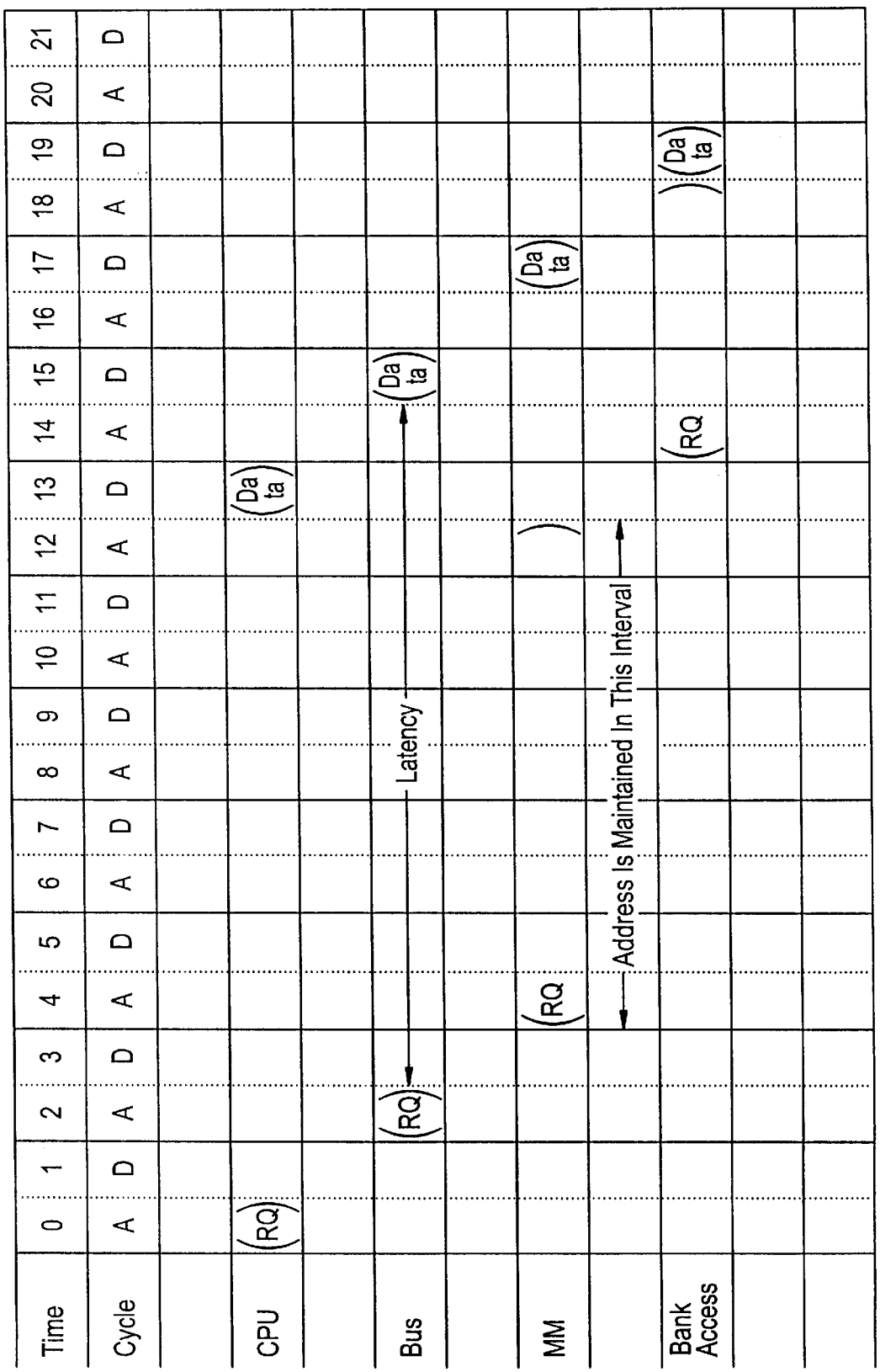

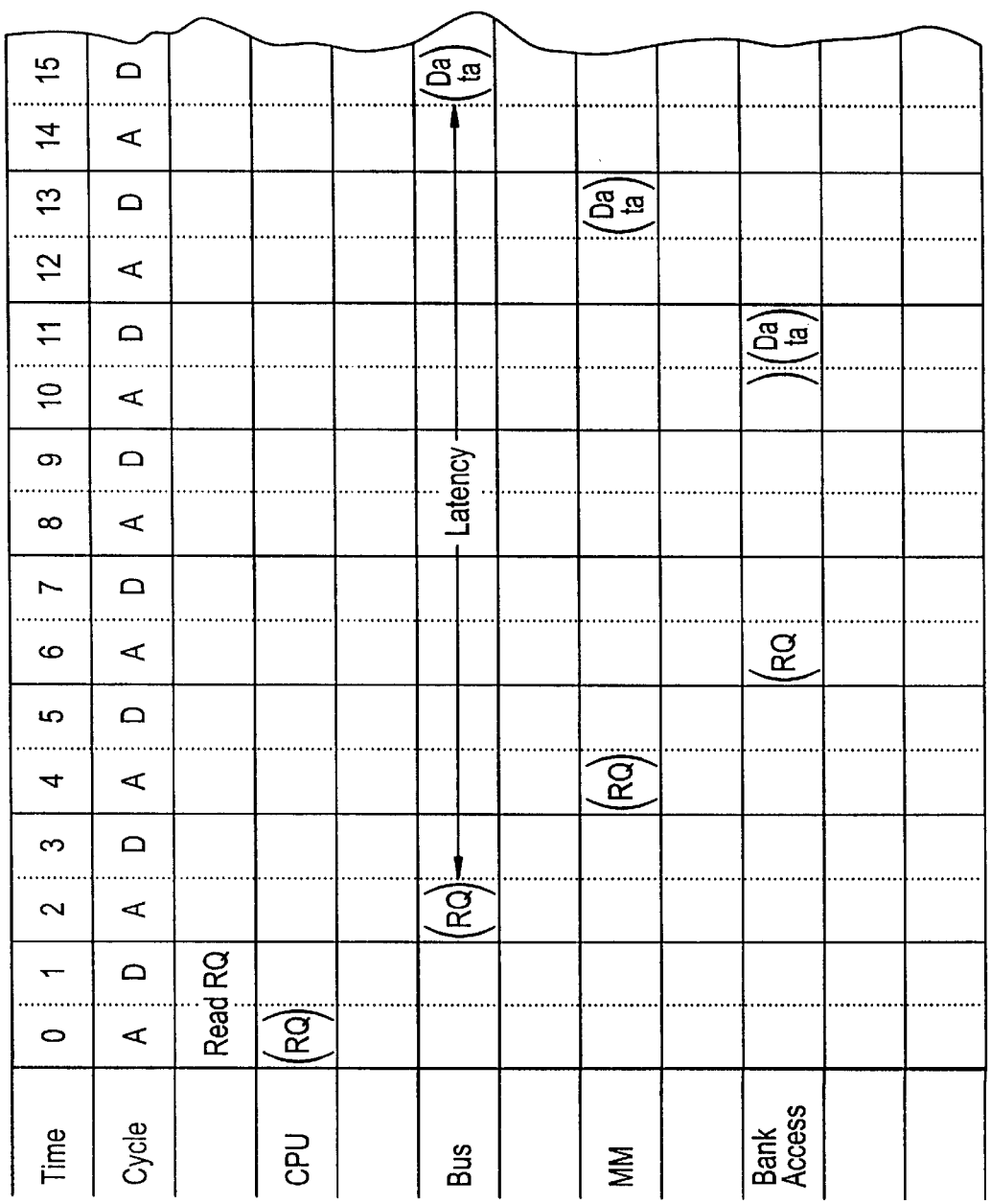

INFORMATION PROCESSING APPARATUS TO CONTROL BUS LATENCY

BACKGROUND OF THE INVENTION

This invention relates to an information processing apparatus and more particularly to an information processing apparatus which includes a bus on which data exist for a predetermined time after a request is issued.

Referring to FIG. 16, a conventional information processing apparatus of this type comprises a plurality of processing units (hereinafter referred to as PU) 1611, . . . , and 1612, a main memory unit (hereinafter referred to as MM) 1613 comprising a plurality of memory units (hereinafter referred to as a bank) shared by the PUs, a system bus (hereinafter referred to as bus) 1614 connecting these units and a control line 1615 for connecting the PUs to each other.

In bus 1614, the transmission performance of an interface between a PU and the bus is equal to that of an interface between the bus and the MM. The transmission performance of a bank interface in the MM depends on the operating time of a memory element. A bus cycle has an address cycle for sending out a request field containing operating instructions (hereinafter referred to as RQ) on the bus and an address field that is referred to during a memory access, and a data cycle for transmitting data. The bus is operated according to a pipeline method. In the bus, data (hereinafter referred to as response data) corresponding to a RQ is transferred in a predetermined time after a RQ is issued. Hereinafter, the time interval, from the time a RQ is issued until data is transmitted, is referred to as latency. In an interval between the time a RQ is issued and the data is transmitted, the bus is kept open so that another RQ can be executed during this time.

A control line 1615 is used for transmitting cache status information existing in an arithmetic operating unit in its own PU to all other PUs answering a RQ issued to the bus. Control line 1615 also transmits a type of the RQ from its own PU to all other PUs in order to maintain cache coherence in the system for mediating competition for each PU to use bus 1614. The cache coherency protocol utilizes a snoop system.

A transmission control unit 1623 comprises: a CPU connecting element 1631, having an interface with the CPU, and for carrying out data transmission between the CPU and the transmission control unit; a bank busy management element 1632 for controlling access of the MM to the bank that determines whether an access is enabled upon issuing a RQ for accessing the bank; a bus competition mediating element 1634 for mediating a request for issuing a RQ to the bus through control line 1615 from each PU connected to the bus and providing any PU with a privilege of use of the bus; a bus connecting element 1635 having an interface with the bus that carries out data transmission between the bus and transmission contrail unit 1623; and a RQ transmission control element 1636 for controlling CPU connecting element 1631 bank busy management element 1632, bus competition mediating element 1634 and bus connecting element 1635.

In timing charts described below, cycle A is a bus address cycle and cycle D is a and data cycle.

According to FIG. 8, at time 0, a read RQ is processed in the PU and, at time 2, the RQ is issued to the bus. At time 4, the RQ is processed in the MM and, in an interval from time 6 to time 10, the bank is accesed. At time 11, the MM reads out data corresponding to the RQ from the bank and, at time 13, the data is transmitted in the MM. At time 15, the data is sent out to the bus and, at time 17, the PU receives the data. The latency on the bus until data is transmitted after the RQ is issued is time 12.

In FIG, IT, at time 0, a write RQ is processed in the PU and at time 2, the RQ is issued to the bus. In an interval from time 4 to time 12, the RQ is maintained to wait for data in the MM and in an interval from time 14 to time 18, the MM accesses the bank of the RQ. At time 13, the write data is transmitted within the PU and at time 15, the data is transmitted to the bus. At time 17, the data is transmitted within the MM and at time 19, the data is written into the bank. The latency on the bus until data is transferred after the RQ is issued is time 12 as in the read operation.

FIG. 18 is a time chart showing data transmission operation (hereinafter referred to as C write) between caches when the read address of a certain CPU to the memory dirty-hits a cache of another CPU. Cycles A and D represent bus address and data cycles, respectively. RQ represents a read RQ. Data represents response data of that RQ. Latency represents bus latency.

From time 0 to time 17 the operation is the same as in FIG. 8. As a result of snooping of the bus, an address requested by the read RQ dirty-hits a CPU cache in another PU, and then a RQ (C write RQ) for data transmission between caches, from the dirty-hit CPU to the CPU which issued the read RE is generated. At time he, the C write RQ is processed in the PU having a dirty-hit CPU and at time 20, the RQ is issued. At time 22, the RQ is processed in the PU which issued the read RQ and at time 33, the data is transmitted to the bus. At time 35, the data is transmitted within the PU which issued the read RQ. The bus latency until corresponding data is transmitted after the RQ is issued is time 12 as in the read operation and write operation.

In the conventional information processing apparatus;, according to timing charts of FIGS. 8, 17 and 18, there is a predetermined latency between the RQ and data. This is common with these kinds of RQs, therefore he latency affects system performance.

A problem with the above described conventional information processing apparatus, is that the latency deteriorates the performance of the write operation to the memory.

Another problem, which arises when transmitting data between caches, is deterioration of the data transmission performance between the caches. This is because the latency of the bus causes a time interval from an issuance of address information to data transmission destination from the CPU until the appearance of transmission data. The delay of the transmission data between caches causes a problem because the operation of the CPU to receive the transmitted data stops.

SUMMARY OF THE INVENTION

Accordingly, an object of the present invention is to provide an information processing apparatus in which the latency of the bus is variable and which uses the bus effectively.

According to one aspect of the present invention, there is provided an information processing apparatus which comprises: a bus having latency; a first element which sends out a request to the bus, wherein the request includes information showing the time that data corresponding to the request exists on the bus; a second element which sends out the data to the bus at the time; a third element which receives the request and identifies a time during which the data exists on the bus; and a fourth element which receives the data in accordance with the time which the element identifies.

According to another aspect of the present invention, there is provided an information processing apparatus which comprises: a bus having latency; a first means for sending out a request to the bus, wherein the request includes information showing the time that data corresponding to the request exists on the bus; a second means for sending out the data to the bus at the time; a third means for receiving the request and identifying a time during which the data exists on the bus and a fourth means for receiving the data in accordance with the time which the element identifies.

According to another aspect of the present invention, there is provided an information processing apparatus which comprises: a bus on which data exist for a predetermined time after the issuance of a request; a processing element which controls an interval for transmitting data and sends out the data to the bus based on the interval; and a storage element which receives the data.

According to another aspect of the present invention, there is provided an information processing method for use in an information processing apparatus which has a bus having latency, wherein the method comprises, sending out a request to the bus, wherein the request includes information showing the time that data corresponding to the request exists on the bus; sending out the data to the bus at the time; receiving the request and identifying a time during which the data exists on the bus; and receiving the data in accordance with the time which the element identifies.

BRIEF DESCRIPTION OF THE DRAWINGS

Other features and advantages of the invention will be made more apparent by the following detailed description and the accompanying drawings, wherein:

FIG. 6 shows the format of RQ/data of the first embodiment of the present invention;

FIG. 7 shows the format of RQ/data of the second embodiment of the present invention;

FIG. 10 is a timing chart of the C write operation for data transmission between caches and between the cache and MM of the present invention;

FIG. 11 is a diagram showing register value changes in the bus busy management element during a read operation according to the first embodiment of the present invention;

FIG. 12 is a diagram showing register value changes in the bus busy management element during a write operation according to the first embodiment of the present invention;

FIG. 13 is a diagram showing the relationship between the register value and mode in the bus busy management element during a write operation according to the first embodiment of te present invention;

FIG. 14 is a diagram showing register value changes in the bus busy management element during a read operation according to the second embodiment of the present invenS1 tion;

FIG. 15 is a diagram showing register value changes in the bus busy management element during write operation according to the second embodiment of the present invention;

FIG. 17 is a timing chart of the write operation of the conventional art; and

In the drawings, the same reference numerals represent the same structural elements.

DETAILED DESCRIPTION OF THE PREFERRED EMBODIMENTS

The first embodiment of the present invention will be described in detail below.

Figure 1A:
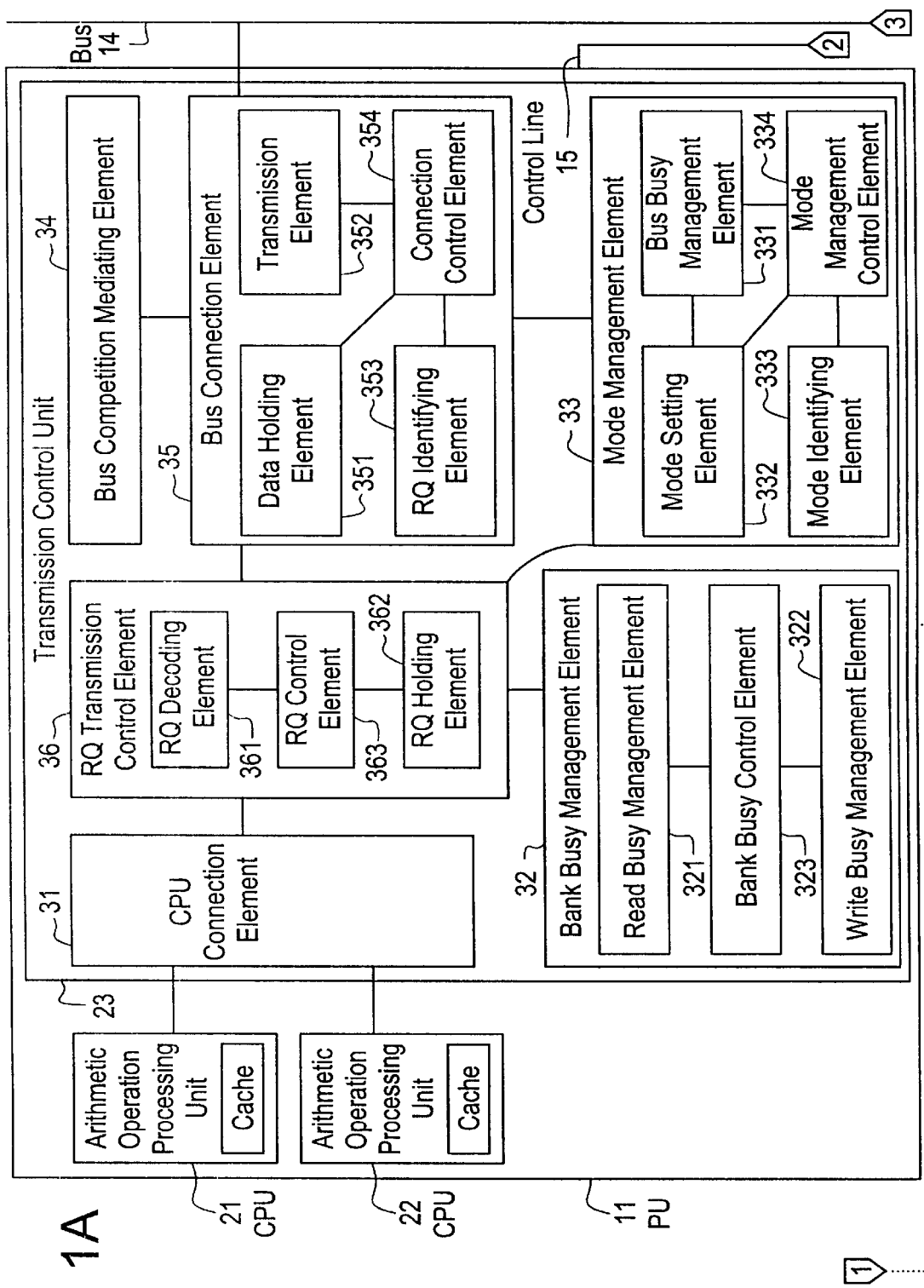
FIG. 1 a block diagram of the present invention.
Figure 1B:
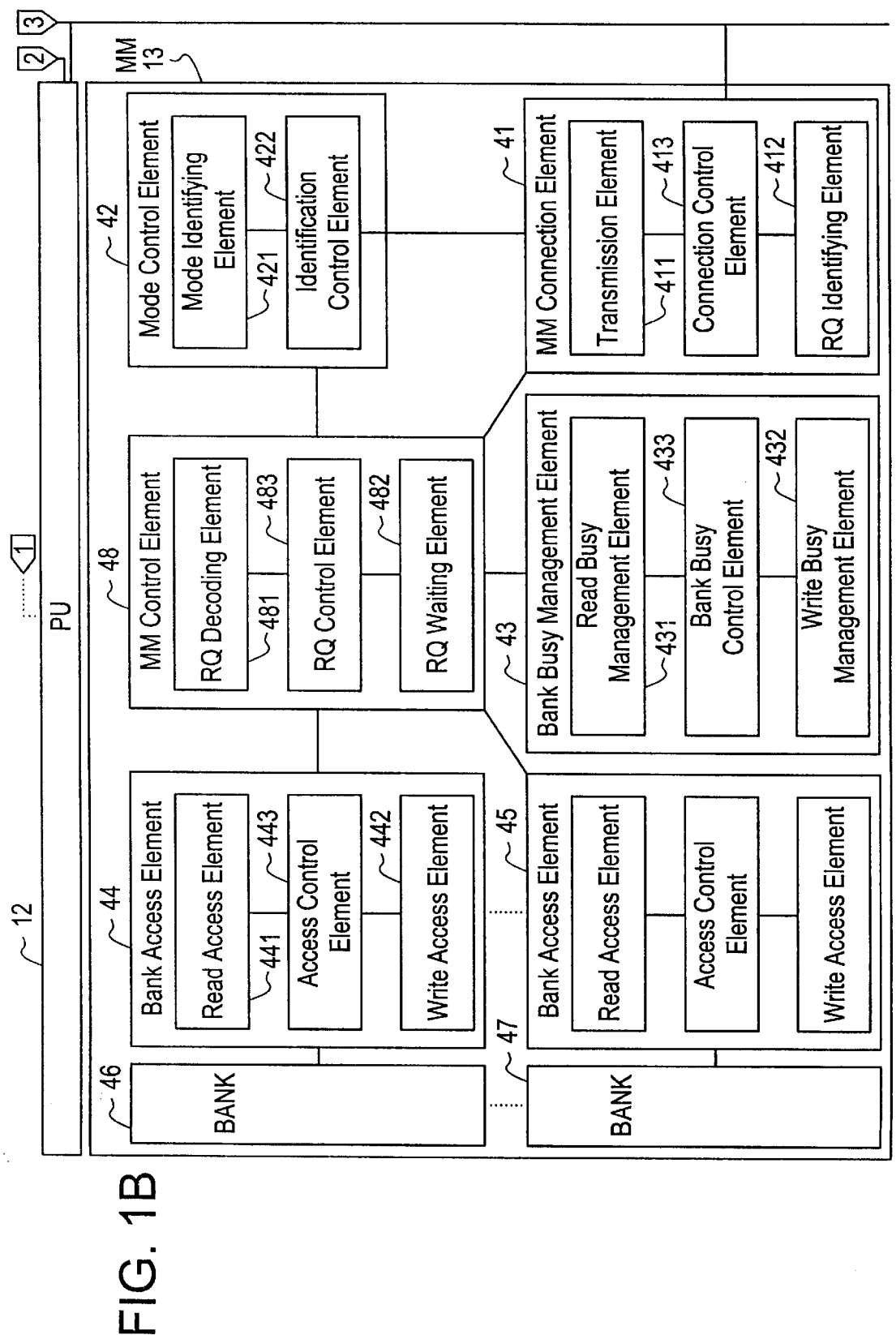

Referring to FIG. 1, an information processing appar;3tus comprises: a plurality of processing units (hereinafter referred to as PU) 11, . . . , and 12; a main memory unit (hereinafter referred to as MM) 13 comprising a plurality of memory units (hereinafter referred to as bank) shared by PUs 11, . . . , and 12; a system bus (hereinafter referred to as bus) 14 connecting these units; and a control line 15 for connecting PUs 11, . . . , and 12 to each other. All of the PUs 11, . . . , and 12 are the same type.

In bus 14, the transmission performance of the interface between PU11 or PU12 and bus 14 is equal to the transmission performance of the interface between bus 14 and MM13. The transmission performance of the interface bank 46 and 47 in MM 13 depends upon the operating time of a memory element. A bus cycle comprises two states: (1) an address cycle for transmitting a request field containing operating instructions (hereinafter referred to as RQ) on bus 14 and an address field to be referred to upon a memory access; and (2) a data cycle. The fundamental operation of bus 14 is based on a pipeline system.

In the read operation to MM 13, response data is always sent back from MM 13 at a predetermined time (hereinafter referred to as latency) after a request. The write operation to MM 13 or the write operation between caches is transmitted in the latency after a RQ by the most rapid data cycle (slowest data cycle after the latency) during which no effective data exists. In any case, in the interval between transmission of a RQ and transmission of data, bus 14 is open, which allows another RQ to be executed.

Control line 15 is used for transmitting cache status information existing in an arithmetic operating unit in its own PU to all other PUs answering a RQ issued to bus 14. Control line 15 is also used to transmit a type of the RQ from its own PU to all other PUs and to maintain cache coherence in the system for mediating competition for PUs 11, . . . , and 12 to use bus 14. The cache coherency protocol utilizes a snoop system.

PU 11 and 12 (PU 11 will be described as an example) comprise: arithmetic operating units (hereinafter referred to as CPU) of the same type having a cache, 21, 22 and a plurality of the CPUs (not shown); and a transmission control unit 23 for controlling data transmission between CPUs 21 and 22 and bus 14.

Transmission control unit 23 comprises: a CPU connecting element 31 having an interface with CPUs 21 and 22 that performs data transmission between CPUs 21 and 22 and the transmission control unit; a bank busy management element 32 for controlling access of MM 13 to banks 46 and 47 and determining whether an access is enabled upon issuing a RQ for accessing the bank; a made control element 33 for controlling the use of the data cycle by bus 14 after a RQ and for setting information on the bus cycle interval of the RQ and data in the RQ as additional information (hereinafter referred to as mode); a bus competition mediating element 34 for mediating a request for issuing RQ to bus 14 through control line 15 from each PU connected to bus 14 and providing any PU with the privilege of using bus 14; a bus connecting element 35 having an interface with bus 14 for carrying out data transmission between the bus and transmission control unit 23; and a RQ transmission control element 36 for controlling the CPU connecting element 31, bank busy management element 32, mode control element 33, bus competition mediating element 34 and bus connecting element 35.

Next, the respective elements of transmission control unit 23 will be described. As a result of mediating a RQ from each PU by bus competition mediating element 34, bank busy management element 32 controls a bank to be used after a RQ of the PU acquiring bus for registering use of the bank and accessing impossible time (hereinafter referred to as bank busy).

Bank busy management element 32 comprises: a read busy control element 321 for controlling bank busy upon memory read RQ (hereinafter referred to as read RQ); a write busy control element 322 for controlling bank busy upon memory write RQ (hereinafter referred to as write RQ); and a bank busy management element 323 for controlling read busy control element 321 and write busy control element 322.

Mode control element 33 contains an entire bus timing register for registering a data cycle used in response data upon a read RQ, and a write RQ and a RQ (hereinafter referred to as C write RQ) for data transmission between caches and cache and MM, and comprises: a bus busy control element 331 for controlling use of a data cycle by the bus; a mode setting element 332 for setting a mode for specifying a time for issuing data to bus 14 by referring to the actual use of the data cycle of bus busy management element 331 when write RQ or C write RQ is issued; a mode identifying element 333 for identifying a mode of a RQ issued to bus 14 and determining a time of issuing data of C write RQ to PU, which includes mode identifying element 333; and a mode management control element 334 for controlling bus busy management element 331, mode setting element 332 and mode identifying element 333.

As a result of mediation by bus competition mediating element 34, bus connecting element 35 comprises: a data holding element 351 for temporarily holding data corresponding to such a RQ that its own PU acquires bus 14 until it is issued to bus 14 at a time specified by a mode set by mode control element 33; a transmission element 352 having an interface with bus 14 for transmitting data to bus 14; a RQ identifying element 343 for identifying a RQ from bus 14 and detecting a RQ to the PU; and a connection control element 354 for controlling the date holding element 351, bus connection element 352 and RQ identifying element 353.

Transmission control element 36 comprises: a RQ decoding element 361 for decoding a RQ issued from the CPU and a RQ from the bus; a RQ holding element 362 for temporarily holding a RQ until busy is released if a bank to be accessed by RQ is busy or if a PU, which includes RQ holding element 362, cannot acquire a bus as a result of mediation by bus competition mediating element 34 and further temporarily holding a subsequent RQ if there is another held RQ; and a RQ control element 363 for controlling RQ decoding element 361 and RQ holding element 362.

FIG. 1 will be described with reference to the structure of MM 13. MM 13 comprises; a MM connection element 41 having an interface with bus 14 for transmitting data between bus 14 and MM 13; a mode control element 42 for identifying the time of data transmission based a mode set in a RQ from bus 14; a bank busy management element 43 having the same function as bank busy management element 32 in each PU; bank access elements 44 and 45, which are of the same type, for controlling access for read/write; banks 46 and 47, which are of the same type and correspond to bunk access elements 44 and 45, respectively, for memorizing data by control from bunk access elements 44 and 45; and an MM control element 48 for controlling the MM connection element 44, mode control element 42, bank busy management element 43 and bank access elements 44, 45, and for waiting for a RQ until data corresponding to that RQ is received if a RQ for write operation to the memory is received.

Next, respective elements constituting MM 13 will be described. The MM connection element 41 comprises: a RQ identifying element 412 for identifying a RQ from bus 14 and detecting a RQ to MM 13; a transmission element 411 having an interface with bus 14 for transmitting data to bus 14; and a connection control element 413 for controlling RQ identifying element 412 and transmission element 41 1.

Mode control element 42 comprises: a mode identifying element 421 for identifying the time of data transmission based on a mode set in a RQ sent from bus 14; and an identification control element 422 for controlling the mode identifying element 421.

Bank busy management element 43 comprises: a read busy control element 431 having the same function as bank busy management element 32 in each PU; a write busy control element and a bank busy management element 433.

Respective bank access elements 44 and 45 (bank access element 44 will be described as an example thereof) comprise: a read access element 441 for controlling the access for reading data from bank 46; a write access element 442 for controlling the access for writing data to bank 48; and an access; control element 443 for controlling read access element 441 and write access element 442.

MM control element 48 comprises: a RQ decoding element 481 for decoding an operation to MM 13 depending on the type of RQ operating instruction from bus 14; a RQ wafting element 482 for waiting for a RQ until data corresponding to that RQ is received if a RQ for a write operation to the memory is received; and a RQ control element 483 for controlling RQ decoding element 481 and RQ waiting element 482.

A memory in the system is defined in a virtual address and in the CPU, an address converted to physical address is used as a RQ address.

Next, the read operation, write operation and C write operations of the first embodiment will be described with reference to FIGS. 1, 3, 4, 5, 6, 8, 9, 10, 11, 12, and 13. A read operation when the CPU 21 Issues a read RQ to bank 46 will be described first. The format shown in FIG. 6 contains four fields including: a valid bit (V) indicating a RQ to the bus; a RQ operating instruction (type); a valid attached information during write operation (mode); and address and number of bank to be accessed (address). For the read RQ, the read operation instruction (instruction format is not indicated) is included in the type field. The data is made up of transmission data. Hereinafter, the respective steps will be referred to as S.

Figure 3A:
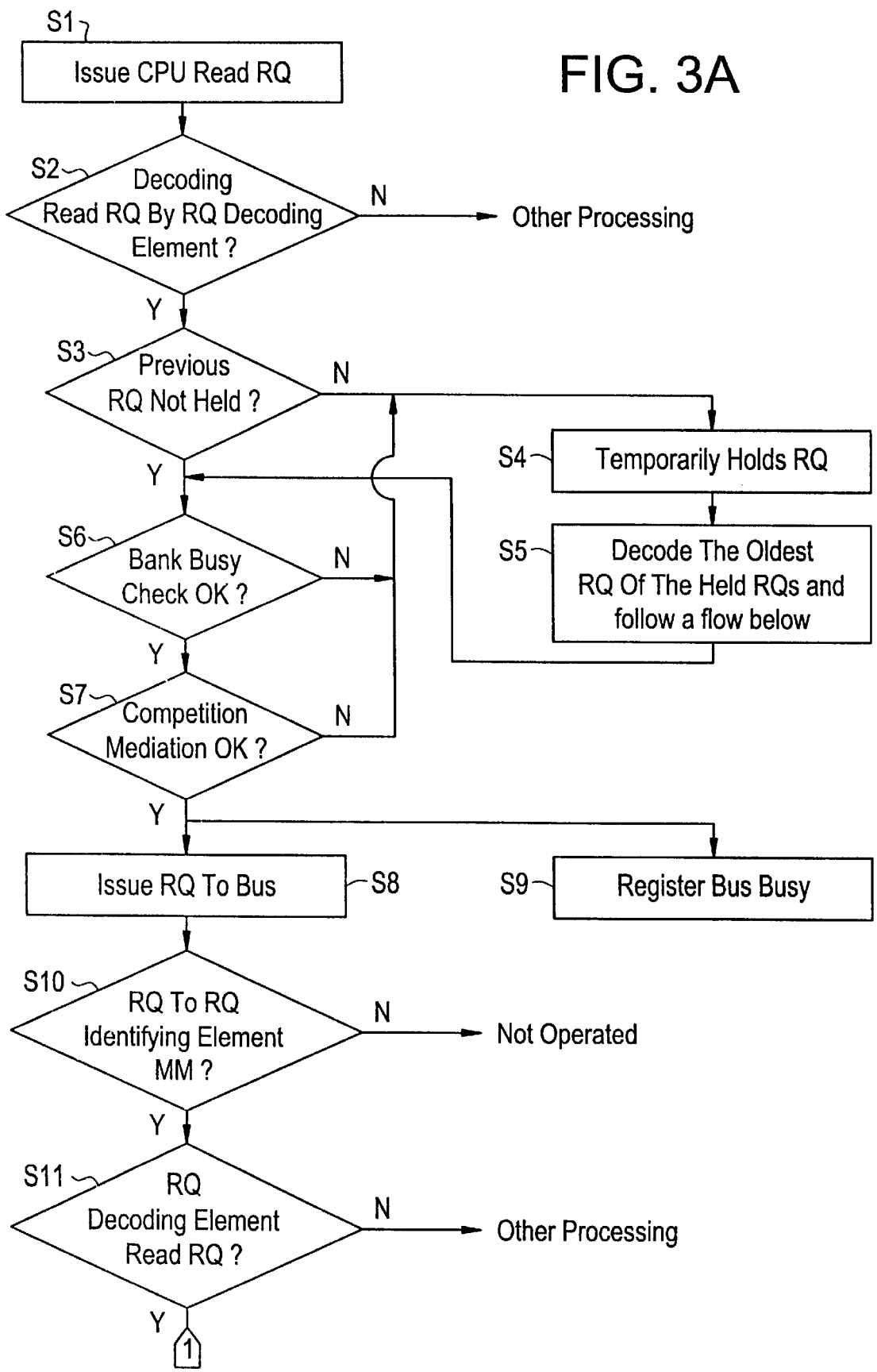
FIG. 3 is a flowchart of the read operation of the present invention.
Figure 3B:
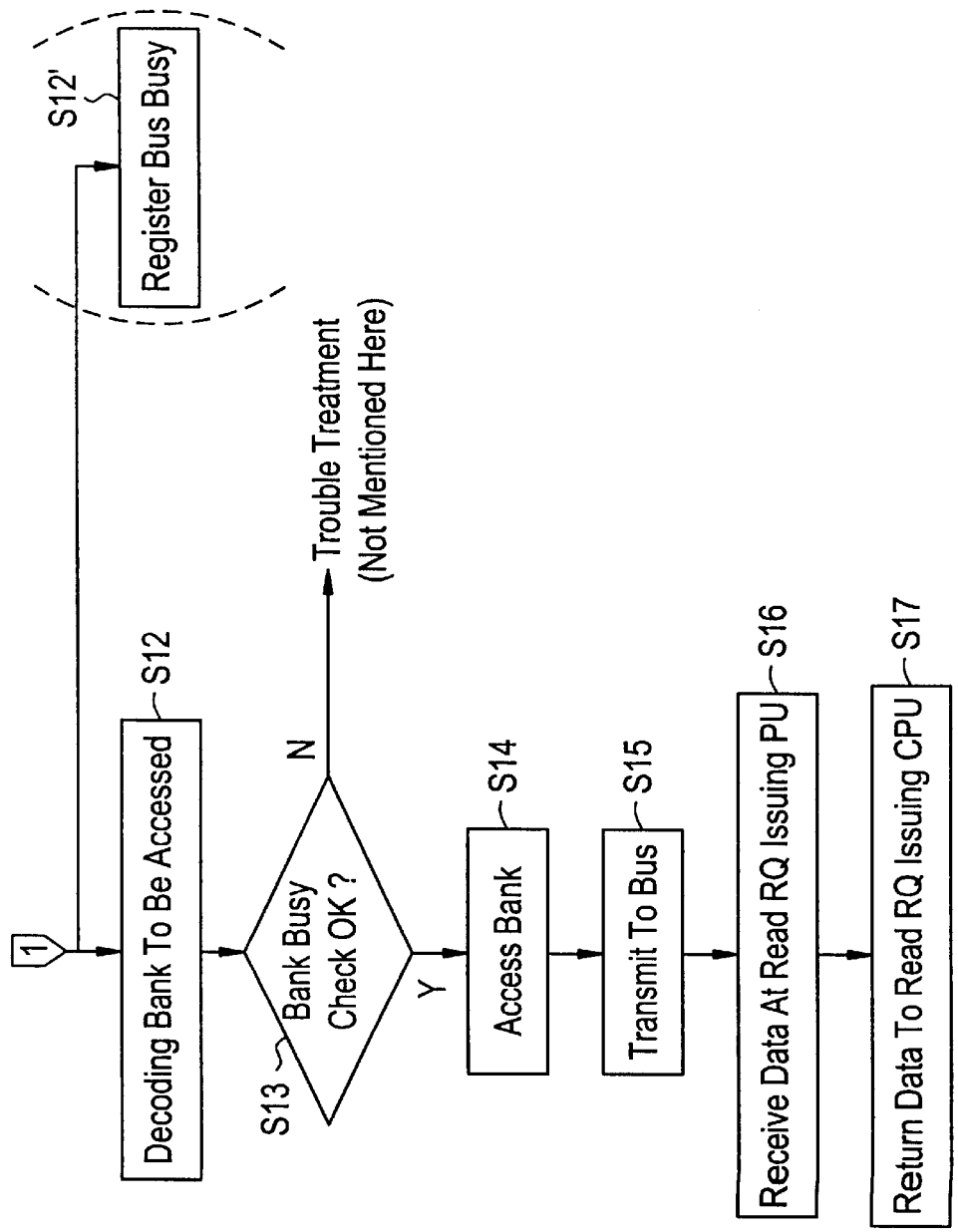

Referring to FIG. 3, CPU 21 issues a read RQ to transmission control unit 23 at S1. In the RQ transmission control unit 36, RQ decoding element 361 receives a RQ through the CPU connection element 31.

If RQ decoding element 361 determines that the RQ is a read RQ with reference to RQ type at S2, it transfers control information about the read RQ to RQ control element 363.

At S3, RQ control element 363 verifies whether a RQ issued by the CPU in a PU, which includes RQ control element 363, is held in the RQ holding element 362. If any RQ are held, at S4 they are held at an end of a line of the RQ held by the RQ holding element 362 holding a decoded RQ at S2. At S5, the oldest RQ existing in the RQ holding element 362 is selected as an operation object for S6 and the following steps. If no RQ are held by the RQ holding element 362, the RQ decoded at S2 is selected as an operation object for S6 and the following steps.

At S6, bank busy management element 32 receives information indicating that a selected RQ is a read RQ and a bank number, refers to read busy control element 321 and verifies whether an appropriate bank (bank 46 in this e,(ample) can be accessed. If access is possible, the processing after S7 is carried out. If access is impossible, the read RQ is temporarily held by the RQ holding element 362 (return to S4).

At S7, bus competition mediating element 34 mediates the competition which may occur between the PUs when each PU issues a RQ to the bus. At this time, bus competition mediating element 34 receives information necessary for mediation from all PUs except PU 11, which includes bus competition mediating element 34, through control line 15 and sends information necessary for all other PUs to all the other PUs. In all the PUs of the system, the processes relating to this mediation are synchronous. If the read RQ of a PU, which includes bus competition mediating element 34, can be issued to the bus as a result of mediation by bus competition mediating element 34, the bank busy state of bank busy management element 32 is updated and processing after S8 is carried out. If the RQ cannot be issued, that RQ is temporarily held in the RQ holding element (return to S4).

At S8, the bus connection element 35 receives read RQ from the RQ transmission control element 36 and issues a read RQ to the bus using transmission element 352.

At S9, the mode control element issues a read RQ to the bus and then registers information indicating that response data of that RQ exists after latency, and that bus data cycle will be used in the bus control element 331.

FIG. 11 shows the register value change in the busy control element 331. The timing register for the entire bus contains timing information during which valid data exists on the bus. Next a situation in which the latency is seven bus cycles will be described. It is assumed that a time 1-bus cycle before a RQ is issued to the bus is time T and a time in which the RQ has been issued is time T+1. At the time T+1, since the time of response data to the issued read RQ is after the latency, a 1 is set at the leftmost bit, which indicates that valid data exists on the bus after the latency. This register is shifted to the right for every bus cycle. At the time in which a 1 comes to the lowest bit, response data of the aforementioned read RQ exists on the bus.

At S10, MM connection element 41 fetches a RQ on the bus and RQ Identifying element 411 identifies RQ according to the RQ type. If that RQ is a RQ for the MM, the processing after S11 is performed, however, if it is not the RQ for the MM, no processing is performed.

At S11, in MM control element 48, RQ decoding element 481 receives a RQ from RQ identifying element 412 and determines the type of the RQ. If the RQ is a read RQ, the processing after S12 is performed, however, if it is not a read RQ, other processing is performed.

At S12, RQ decoding element 481 determines a bank to be accessed with reference to a bank number contained in the address field of the RQ (it is determined to be access to bank 46 in this example).

At S13, bank busy management element 43 receives a bank number for accessing information indicating that the RQ is a read RQ from RQ decoding element 481, refers to read busy control element 431 and then confirms whether an appropriate bank (bank 46) can be accessed. If access is possible, the processing after S13 is performed. If access is impossible, it is determined that a problem exists and a process for correcting it is performed (an operation for correcting the problem will not be described here). If information of the bank which can be accessed is received, the state of the bank busy is updated.

At S14, bank access element 44 receives a read instruction from RQ decoding element 481 through read access element 441 and reads data from an address specified by a bank address contained in the RQ address field.

Data read out from the bank at S15 is transmitted from transmission element 411 of MM connection element 41 to the bus through bank access element 44 and MM control element 48. This data is transferred to the bus in a latency after a read RQ is issued to the bus.

At S16, PU 11 receives data existing on the bus in the latency after the RQ identifying element 353 issues a RQ to the bus, as response data of that RQ.

At S17, RQ transmission control element 36 receivers the response data, sends data back to CPU 21 which issued a read RQ through CPU connection element 3 and then terminates the series of the read operations.

Figure 8:
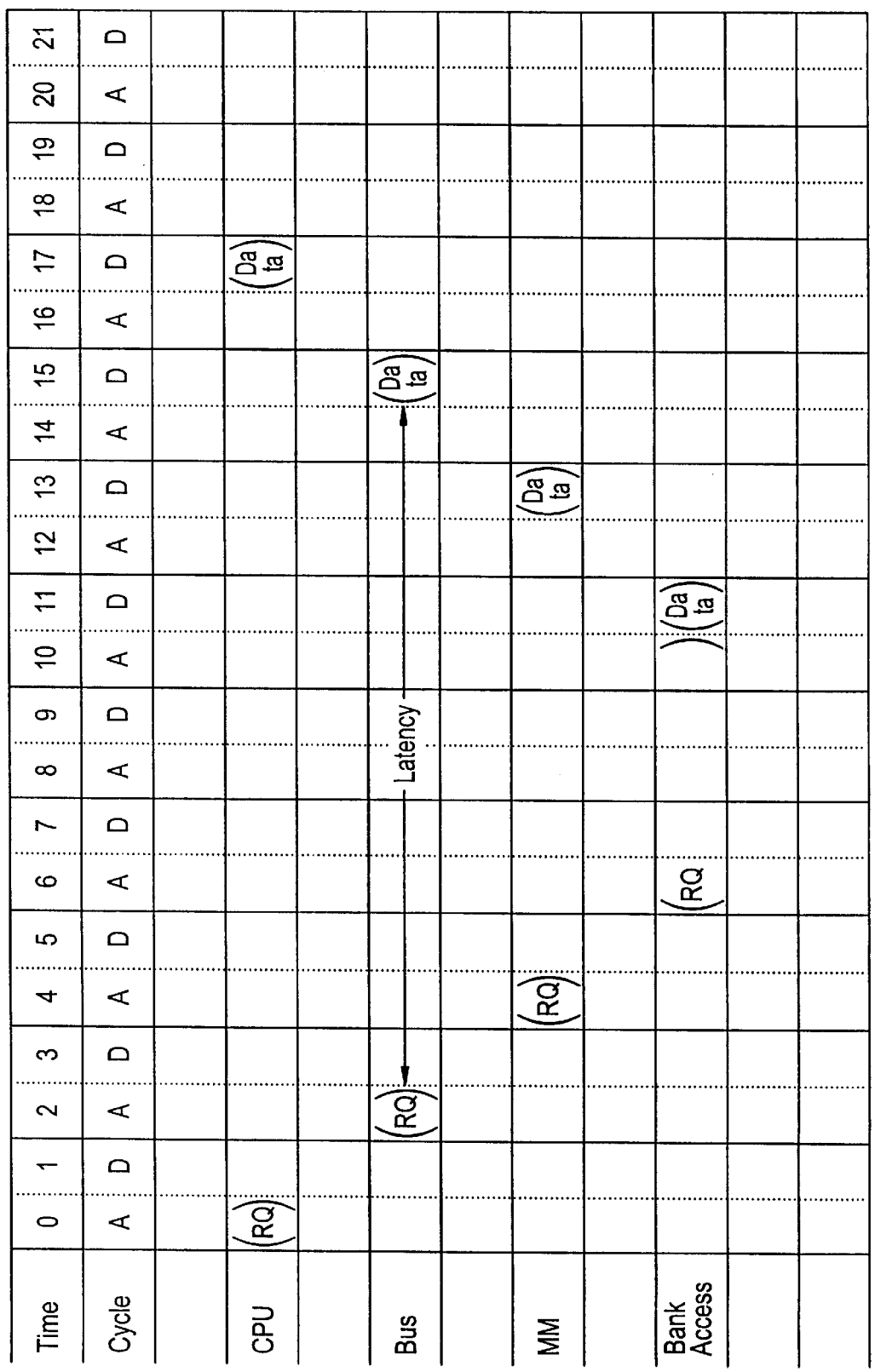
FIG. 8 is a timing chart of the read operation according to the first and second embodiments of the present invention and conventional art.

FIG. 8 is a timing chart of the read RQ operation according to the first embodiment. In FIG. 8, cycle A represents the bus address cycle, cycle D represents the data cycle of the bus address cycle. RQ represents read RQ, data represents response data of that data, and latency represents bus latency. In the timing chart of the read RQ operation, the first embodiment is the same as in the conventional art (see the description of the read operation of the conventional art in the Background section).

Next, the write operation of the first embodiment will be described with reference to FIGS. 1, 4 and 6. The example described is a situation where the CPU 21 issues a write RQ to bank 46.

Figure 4A:
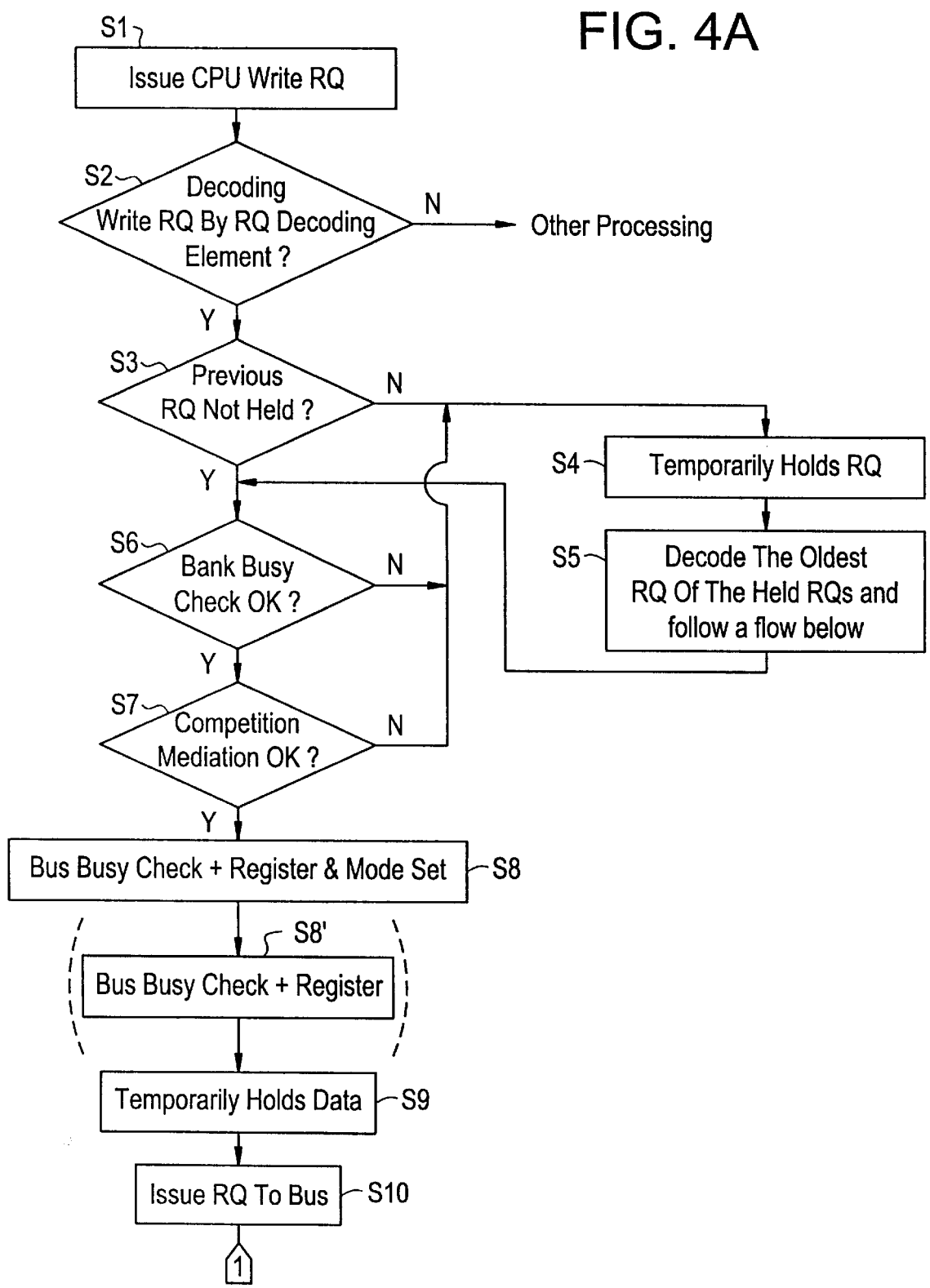
FIG. 4 is a chart of the write operation of the present invention.
Figure 4B:
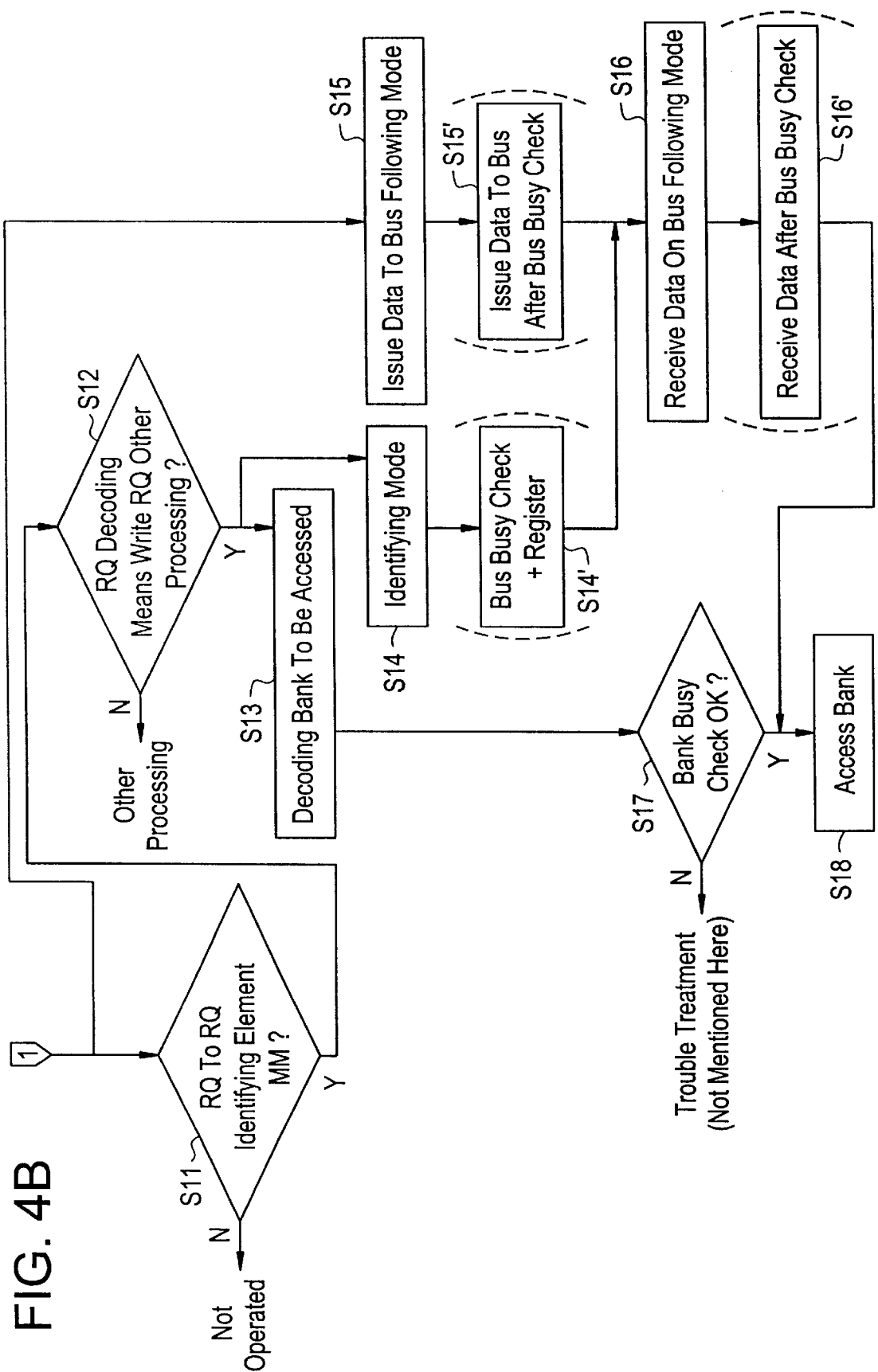

Referring to FIG. 4, at S1, CPU 21 issues a write RQ and a write data corresponding to the RQ to transmission control unit 23. In RQ transmission control unit 36, RQ decoding element 361 receives the RQ and data through CPU connection element 31.

If at S2, RQ decoding element 361 determines that it is a write RQ according to the RQ type, it transfers control information relating to the write RQ to RQ control element 363. At S3, RQ control element 363 verifies whether a RQ issued by the CPU in a PU, which includes RQ control element 363, is held in RQ holding element 362. If any RQ are held, at S4, they are held at end of a line of the held RQ by RQ holding element 362 which holds decoded RAS at S2. At S5, the oldest RQ existing in RQ holding element 362 is selected as an operation object for S6 and the following steps. If no RQ are held by the RQ holding element 362, the RQ decoded at S2 is selected as an operation object for S6 and the following steps.

At S6, bank busy management element 32 receives information indicating that a selected RQ is a write RQ and a bank number, refers to writer busy control element 322 and verifies whether an appropriate bank (bank 46 in this example) can be accessed. If access is possible, the processing after S7 is performed. If access is impossible, the read RQ is temporarily held by the RQ holding element 362 (then the process returns to S4).

At S7, bus competition mediating element 34 mediates competition which may occur between the PUs when each PU issues a RQ to the bus. At this time, bus competition mediating element 34 receives information necessary for mediation from all PUs except the PU 11, which includes bus competition mediating element 34, through control line 15 and sends information necessary for all other PUs to all the other PUs. In all the PUs of the system, the processes relating to this mediation are synchronous. If the write RQ of a PU, which includes bus competition mediating element 34, can be issued to the bus as a result of mediation by bus competition mediating element 34, bank busy state of bank busy management element 32 is updated and processing after S8 is performed. If the RQ cannot be issued, that RQ is temporarily held in the RQ holding element (then the process returns to S4).

If the write RQ of a PU, which includes mode control element 33, is in a state of being issued to the bus as a result of mediation by bus competition mediating element 34 at S8, mode control element 33 receives information that RQ is a write RQ and bus control element 331 confirms the use condition of bus data cycle. Because the bus is operated in a pipeline system, write data corresponding to a write RQ can be transferred to the bus in the latency after the write RQ is issued to the bus, however if there are any data cycles which have not been used before the latency, after the write RQ is issued, the data can be transmitted to the bus during tine fastest data cycle not in use. In this case, information comprising write data transmission time, namely data cycle application time, is registered in bus busy management element 331 and then information about using the data cycle is set as a mode in the write RQ by mode setting element 332.

FIG. 12 shows changes of a register value in bus busy management element 331 (see S9 of read RQ operation according to the first embodiment). Referring to FIG. 12, the status of the register value (T) indicates a current bus application condition. Data cycle, which is a time for using data cycle, corresponds to a position in which the register value is 0. For example, if the register value is "xxxxx0", the position of 0 is located at the far right. This indicates a time for issuing the write RQ onto the bus using a first bus cycle. Likewise, if the register value is "xxxx01", the position of 0 is second from the right. This indicates a time for issuing the write RQ onto the bus using the second bus cycle. This bus timing corresponds to a mode shown in FIG. 13. That is, if a register value (T) shown in FIG. 12 is referred to when a write RQ is issued, a mode corresponding to the register value is determined.

When a write RQ is issued, the position in which the register value is 0 is set to 1. If the register value (T) is "xxxxx0", "xxxxx1" is set. If the register value is "xxxx01", "xxxx11" is set. If a bus cycle is passed, the register value shifted to the right is a register value (T+1). That is, in case of "xxxxx1", "0xxxxx" is set. In case of "xxxx11", "0xxxx1" is set. A "0" set in the far left bit means that no data exists in the latency.

At S9, bus connection element 35 receives a write RQ and write data from RQ transmission control element 36 and a mode from mode control element 33, and the write data is temporarily held in data holding element 351 until a data cycle specified by the mode.

At S10, bus connection element 35 issues a write RQ to bus 14 using transmission element 352. At S11, MM connection element 41 fetches a RQ on the bus and identifies the RQ according to the RQ type by RQ identifying element 412. If it is a RQ to the MM, processing after S12 is performed. If it is not a RQ to the MM, no operation is performed.

At S12, in MM control element 48, RQ decoding element 481 receives a RQ from RQ identifying element 412 and determines the RQ type. If it is a write RQ, until a write data corresponding to the write RQ is received, the valid bit, bank address and bank number of the RQ are temporarily held in RQ waiting element 482 and processing after S13 is performed. Unless it is write RQ, other operations are performed.

At S13, RQ decoding element 481 determines the bank to be accessed from a bank number contained in the RQ address (in this example, it is determined to be an access to bank 46). At S14, In mode control element 42, the RQ mode is received by mode identifying element 421. Mode identifying element 421 identifies how many bus cycles will pass when a write data corresponding to a received write RQ exists on data cycle bus according to the content of the mode.

At S15, in bus connection element 35 of PU 11 for issuing a write RQ, data held in data holding element 351 is transferred to the data cycle bus specified by the mode of that RQ.

At S16, MM connection element 41 receives data existing in a data cycle specified by the mode of RQ identifying element 412 according to an instruction from mode control element 42 from the bus.

At S17, bank busy management element 43 receives information indicating that the RQ is a write RQ from RQ decoding element 481 and a bank number to be accessed from RQ waiting element 482, refers to write busy control element 432 and confirms whether an appropriate bank (bank 46 in this example) can be accessed. If access is possible, processing after S18 is performed. If access is impossible, a problem is identified and then a process for correcting the problem is performed (a process for correcting of the problem will not be described here). Further, if information about a bank which can be accessed is received, the bank busy status is updated.

At S18, bank access element 44 receives a write instruction from RQ decoding element 481 through write access element 441, receives a bank address of a RQ from RQ waiting element 482, writes data in a specified addres5s and terminates the series of write operations.

Figure 9:
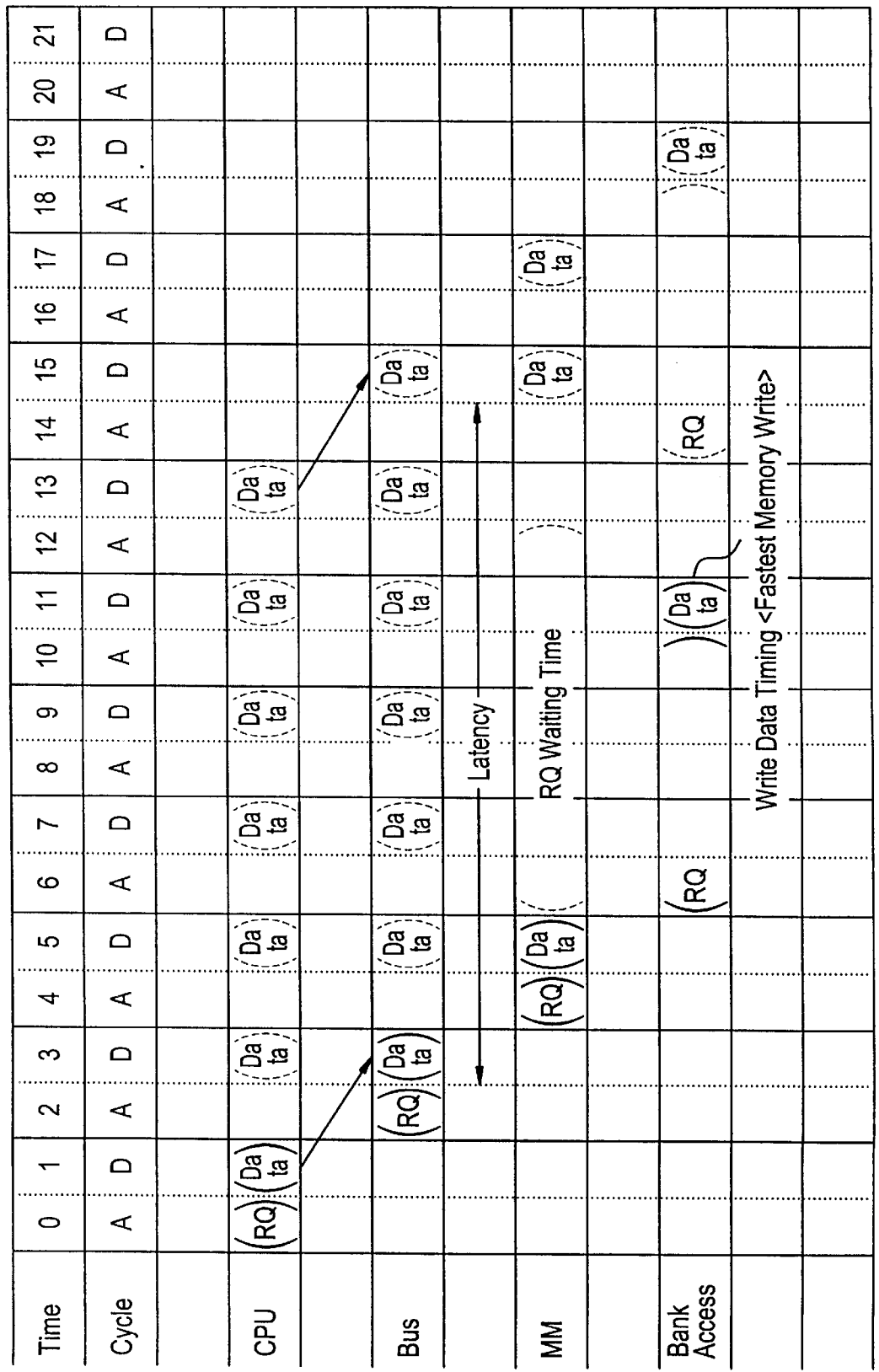
FIG. 9 is a timing chart of the write operation of the present invention.
Figure 16A:
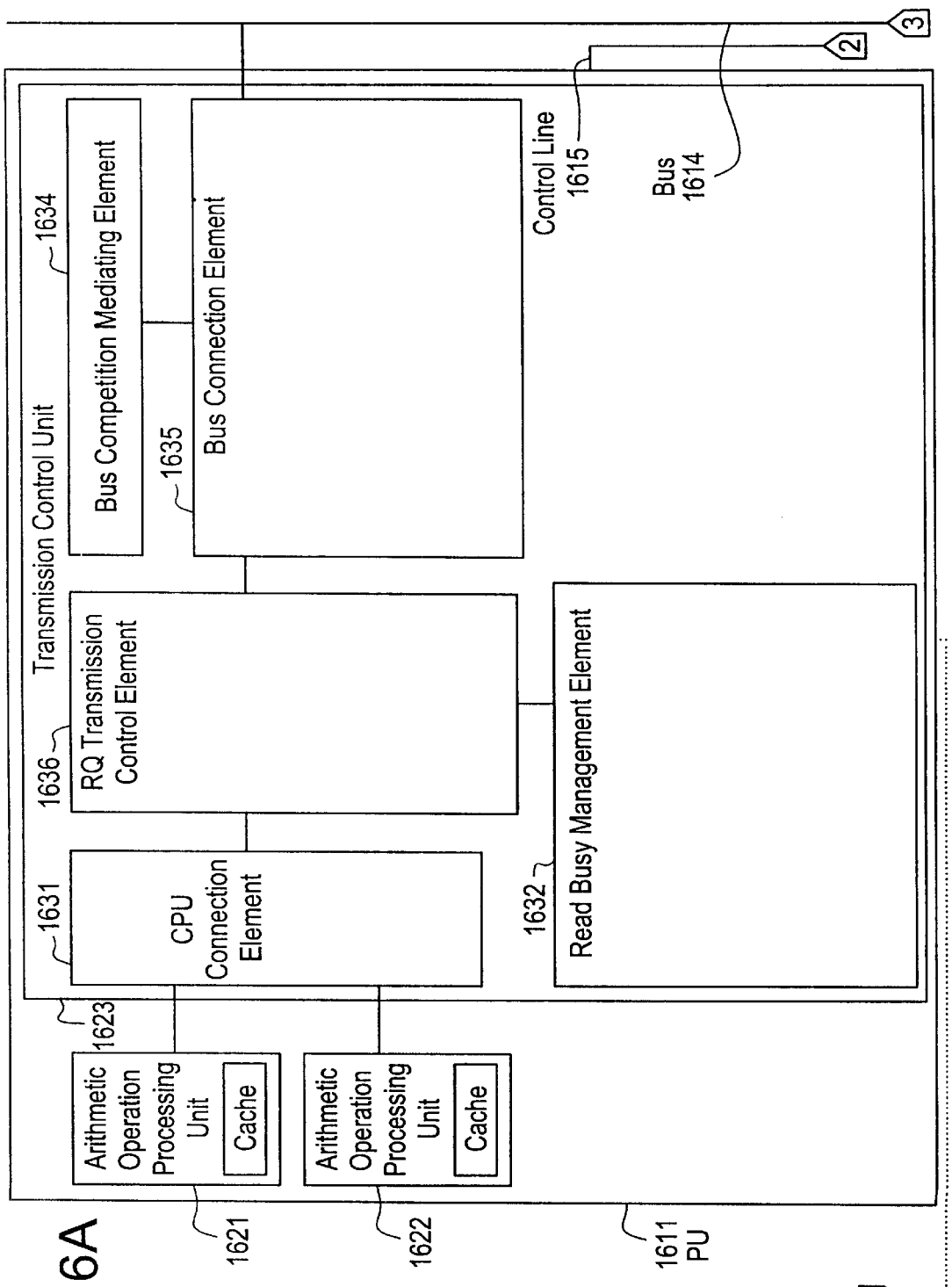
FIG. 16 is a block diagram of the conventional art.
Figure 16B:
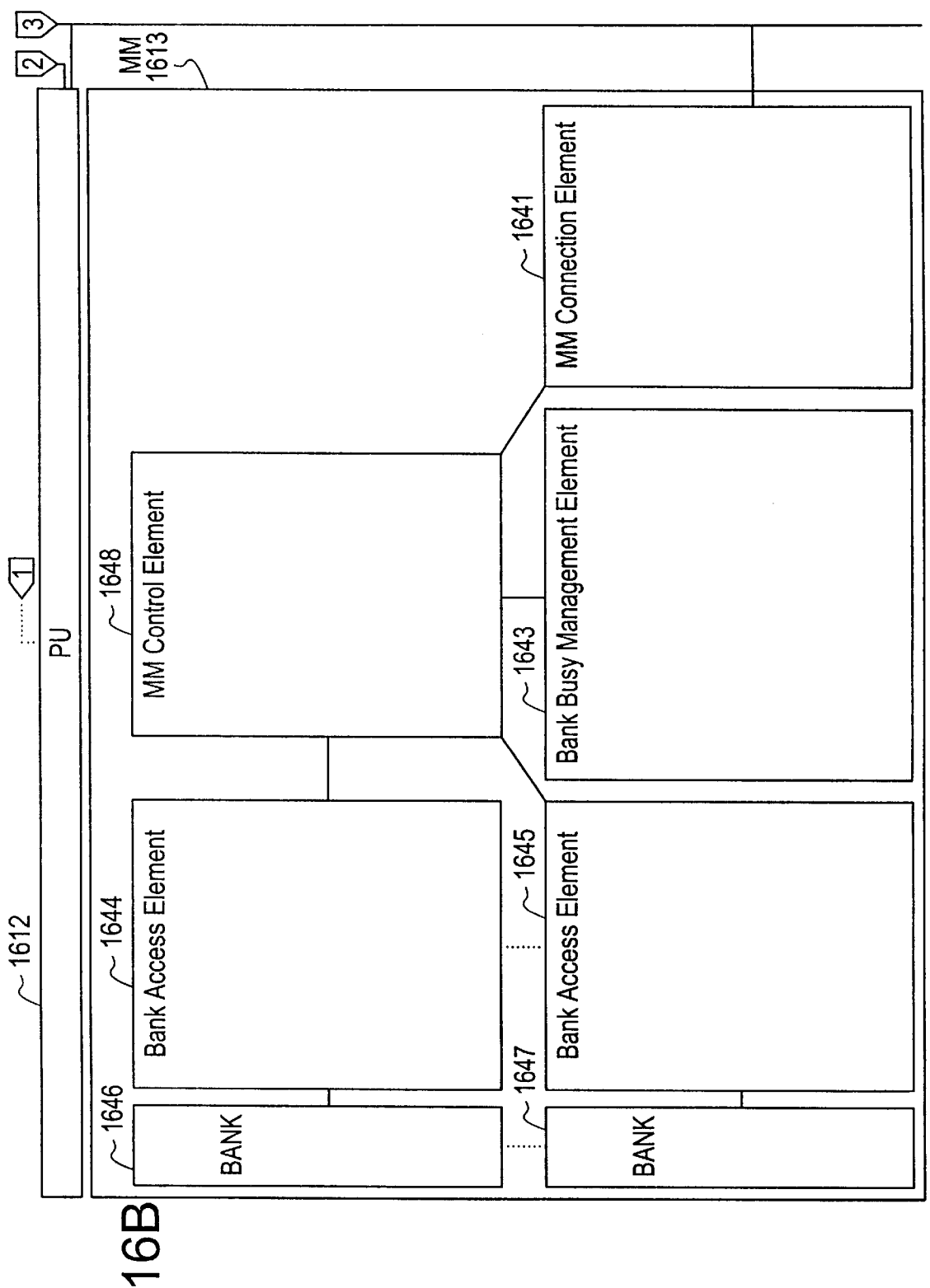
Figure 18B:
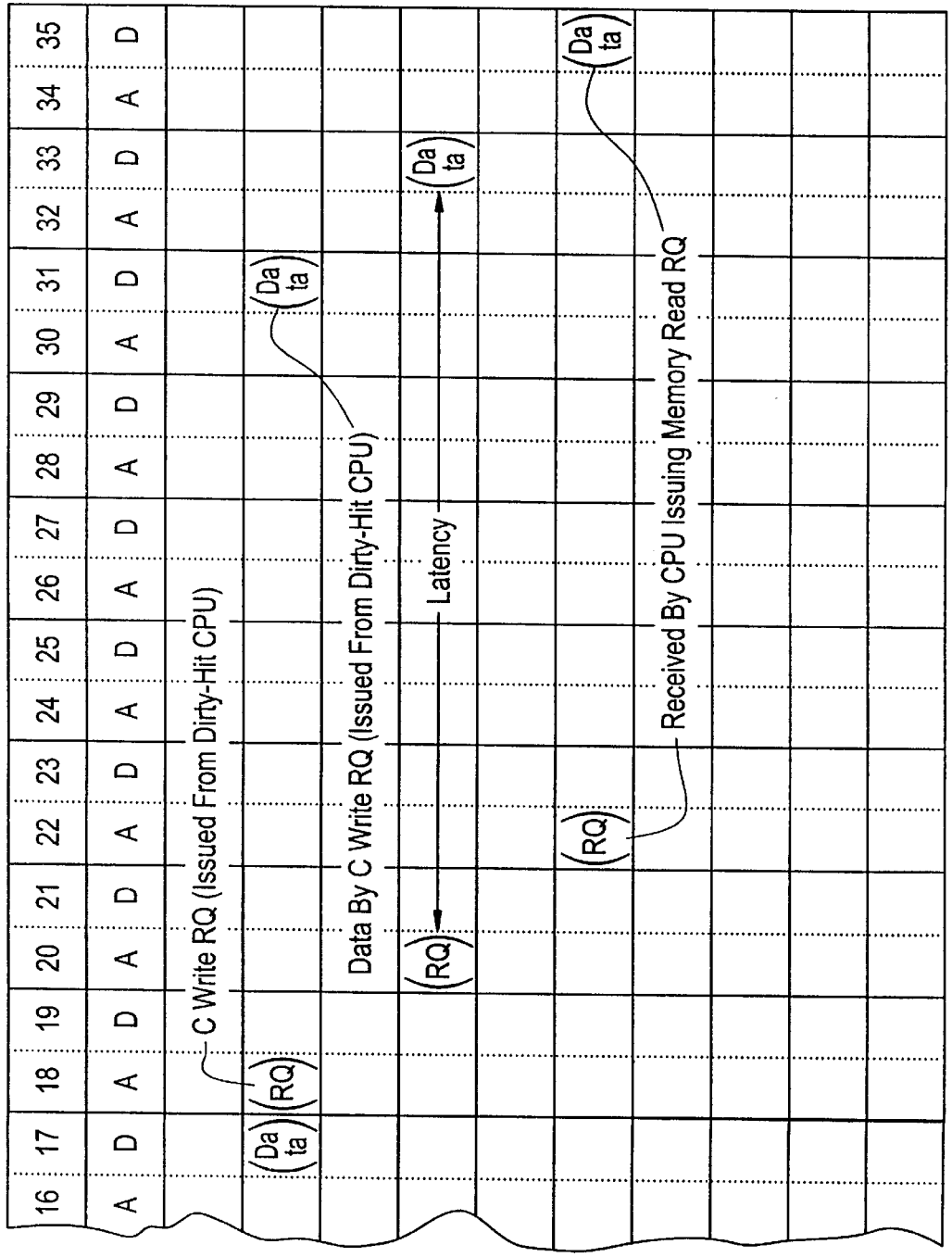
FIG. 18 timing chart of the C write operation of the conventional art.

FIG. 9 shows a timing chart of the write RQ operation in the first embodiment. In this Figure, cycles A and D represent 2 bus address cycle and data cycle, respectively. RQ represents write RQ, data represents response data of that RQ and latency represents bus latency.

In FIG. 9, the fastest timing, until write data exists on the bus after a write RQ is issued to the bus, is represented by a solid line and a data cycle time, in which write data exists depending on the mode, is represented by a dotted line. At time 0, the write RQ is processed in the PU and at time 1, the write data is transferred to the PU. At time 2, the RQ is issued to the bus and at time 3, the data is transferred to the bus. At time 4, the RQ is processed in the MM and at time 5, the data is transferred in the MM. From time 6 to time 10, the MM accesses the bank of the RQ and at time 11, the data is written into the bank. Latency on the bus, until data is transferred after the RQ, is issued element time 0, which indicates that there is no latency.

The dotted line in FIG. 9 indicates that the latency is late by 1 bus cycle. At time 15, the data is issued latest at the end of the latency, which is the same as the latency of a read operation, time 12.

Figure 5:
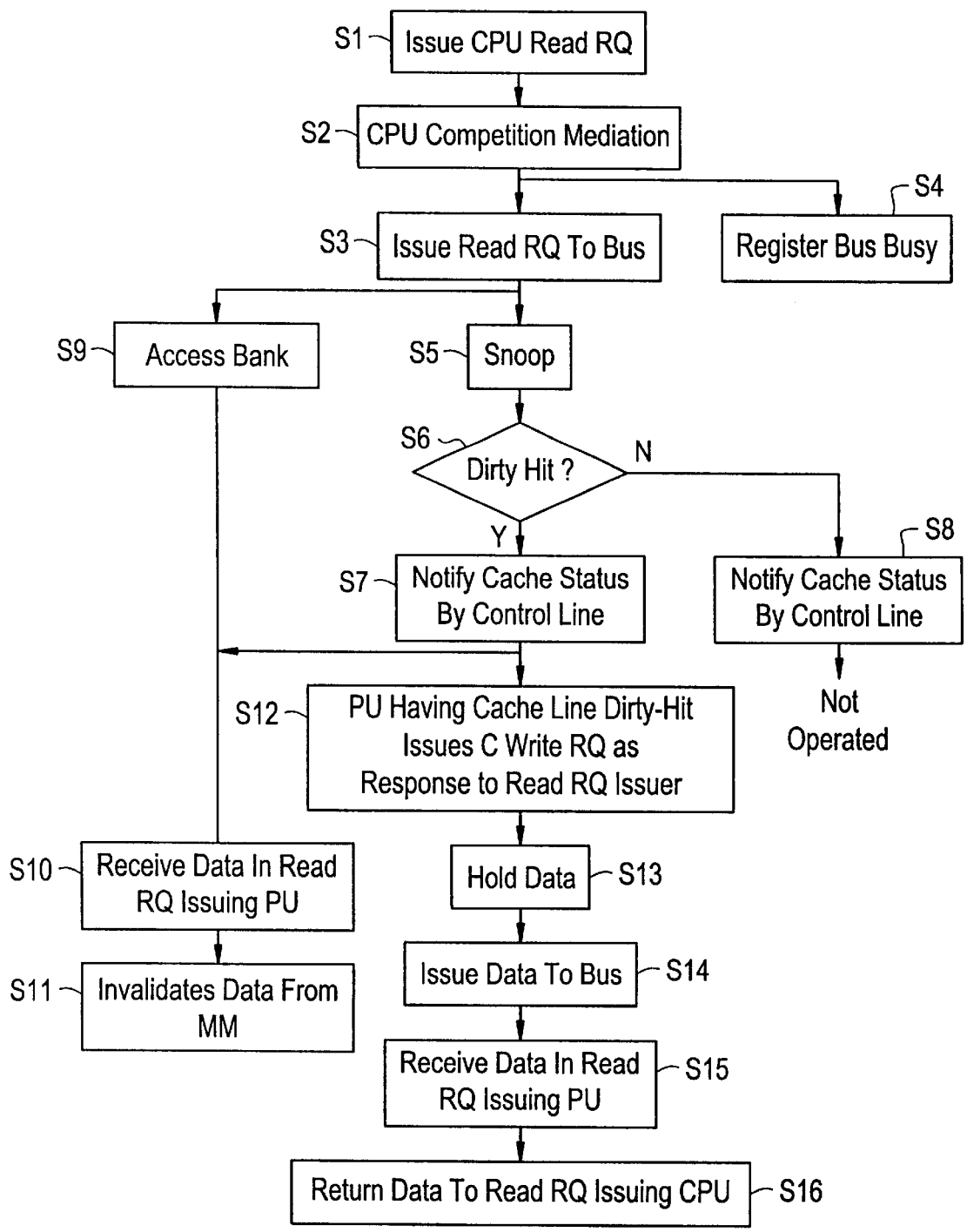
FIG. 5 is a flowchart of the C write operation of the present invention.

Next, a write operation in which CPU 21 issues a read RQ to bank 46, the RQ dirty hit a cache line existing in PU 12 and PU 12 issues a C write RQ to PU 11 according to the first embodiment will be described with reference to FIGS. 1, 5, 6, 9. FIG. 5 is a flow chart of the write RQ operation according to the first embodiment, in which the flow chart and the description of the read RQ of FIG. 3 and the flow chart and the description of write RQ of FIG. 4 will be used. For the description, designations and reference numerals of FIG. 1 will be used. If the description of the write RQ operation of FIG. 4 is used, write RQ is replaced with C write RQ.

At S1, CPU 21 issues a read RQ to transmission control unit 23. Because subsequent processing is the same as description S1 of the read RQ operation, that description is omitted.

Because the processing for S2 is the same as that for the read RQ, a description of S2 to S7 is omitted. Because the processing for S3 is the same as that for the read RQ, a description of S8 is omitted. Because the processing for S4 is the same as that for the read RQ, a description of S9 is omitted.

At S5, in all PUs except a PU which issues a read RQ (PU 12 in this example), the bus is snooped at every address cycle to maintain cache coherency in the system.

At S6, PU 12 compares an address field of a snooped RQ with a cache line existing in its own PU, and if data requested by the read RQ dirty-hits the cache line, processing after S7 is performed. If a dirty hit does not occur, processing of S8 is not performed.

At S7, PU 12 notifies all other PUs (PU 11 in this example) that the read RQ will dirty-hit its own PU and the C write RQ will be issued through control line 15. Therefore, CPU 21, which issues the read RQ identifies that the write RQ, will be issued according to the read RQ.

At S8, PU 12 notifies all other PUs (PU 11 in this example) that the read RQ did not dirty-hit its own PU through control line 15. In this example, PU 11 is not operated based on the information from control line 15.

Because the processing of S9 is the same as that for the read RQ operation, a description of S10 to S14 is omitted. Because the processing of S10 is the same as that for the read R0, a description of S15 to S16 is omitted. Because CPU 21 which issued the read RQ at S11 is notified that at 57 it will be supplied with data depending on a write RQ from PU 12 corresponding to a read RQ issued by itself, response data from MM 13 is invalidated.

The CPU (belonging to PU 12 in this example) having a cache line dirty-hit at S12, issues a C write RQ to PU 11, which issued the read RQ in response to that RQ.

Because the processing of S13 is the same as that fc)r the write RQ operation, a description of S2 to S9 is omitted. However, because of the operation of the PU 12, no reference numerals are referred to.

Because the processing of S14 is the same as that far the write RQ operation a description of S10, S11, S14 and S15 is omitted. However, because of the operation of PU 12, no reference numerals are referred to.

At S15, PU 11 is operated in the same way as the description of the read RQ operation corresponding to the C write RQ, S16. At this time, data is received from the bus at a time specified by the mode of the C write RQ from mode identifying element 333.

The processing of S16 is the same as the read RQ operation described in S17, and the series of the C write RQ operation ends.

The C write RQ operation of the first embodiment will be described through a timing chart with reference to FIG. 10. In FIG. 10, cycle,. A and B represent a bus address cycle and data cycle, respectively. RQ represents read RQ and C write RQ, data represents response data of that RQ and write RQ d3ta, and latency represents bus latency. Referring to FIG. 10, because the read RQ Is issued to the bus, the C write data is issued to the bus, and it indicates that data of the C write RQ exists on the bus at the fastest time.

From time 0 to time 18, the same read operation as in the conventional art is performed (see a description of the C write RQ operation of the conventional art in the Background section). At time 19, write data is transferred into the PU and at time 20, the RQ is issued to the bus. At time 21, the data is transmitted to the bus and at time 22, the RQ is processed in the PU which issued the read RQ. At time 23, the data is transmitted in the PU which issued the read RQ. The latency, until corresponding data is transferred after the C write RQ is issued, is time 0, which means there is no latency.

FIG. 10 shows that data can be issued to the bus any time up to the end of the latency which is the same as the latency of the read operation time, time 12. This is in contrast to the conventional operation where data can only the issued at the end of the latency.

As described above, an effect of the present invention, because according to the first embodiment, time between RQ by the mode and data is made variable when the RQ is issued while the write operation to the memory is performed, an interval between the RQ and data on the bus can be reduced to be less than the latency. As a result, at the time of issuing the write RQ or C write RQ, waiting time until the CPU receives data, after it receives a RQ, can be reduced to be less than the latency, so that a drop in the performance due to the waiting time can be suppressed.

Next, a second embodiment of the present invention will be described below. In the second embodiment of the present invention, mode control element 33, which is contained in each PU of the first embodiment, is replaced with bus control element 49 and mode control element contained in MM 13 is replaced with bus control element 49, which is contained in each PU.

Bus control element 49 in PUs 11, . . . , and 12 and bus, control element 49 in MM 13 are the same element. Bus control element 49 of the second embodiment comprises: two kinds of registers for registering a data cycle to be used by response data according to a read RQ and a data cycle to be used by a write RQ (hereinafter referred to as C write RQ) for transmission between caches and between cache and MM; a bus busy management element 491 for controlling the use condition of the data cycle of the bus depending on RQ; and a bus management control element 492 for controlling bus busy management element 491.

The read operation, write operation and C write operation of the second embodiment will be described with reference to FIGS. 2, 3, 4, 5, 7, 8, 9, 10, 14, and 15. Referring to FIG.

3, a description of the read RQ operation according to the second embodiment includes S12'. FIG. 7 shows a format of address/data cycle, which comprises three fields including: a valid bit (V); a RQ operation instruction (type); and address and number of a bank to be accessed. For the read RQ, a read operation instruction (instruction format is not shown) is included in the type field. Data is comprised of transmission data.

A read operation when CPU 21 Issues a read RQ to bank 46 will be described with reference to FIG. 3.

At S1, CPU 21 issues the read RQ to transmission control unit 23. The subsequent operations are the same as S1 to S12 of the first embodiment, However, the operation of S9 is different. FIG. 14 shows a change of the register value in bus management element 491 at S9. Bus management element 491 includes a valid timing register as well as the timing register for the entire bus in bus busy management element 331 of the first embodiment. This valid timing register indicates that a valid RQ is outputted from a PU, which includes the valid timing register, to a timing registered in the entire bus timing register and is shifted to the right at every bus cycle. In this valid timing register, if a 1 set in the entire bus timing register is valid to a PU, which includes the valid timing register, a 1 is set at the same timing, and if it is not valid, a 0 is set.

At S12', bus management element 49 receives information that the RQ received by MM 13 from MM control element 48 is a read RQ and registers a data cycle time for the response data of that RQ to use a bus in bus busy management element 491. The operation of the register of bus busy management element 491 is the same as that of bus busy management element 491 of S9 (however, "a PU, which includes the register" should be read as "a MM, which includes the regisler").

The processing from S13 to S17 is the same as the description of the read operation in the first embodiment. Then, the series of the read operations ends.

FIG. 8 is a timing chart of the read RQ operation according to the second embodiment. In the timing chart of the read RQ operation, the second embodiment is the same as the first embodiment and conventional art (see the timing chart of the read RQ according to the first embodiment).

The write operation in a situation where the CPU 21 issues a write RQ to bank 46 according to the second embodiment will be described with reference to FIG. 4. In a description of the write RQ operation according to the second embodiment, S8' is used instead of S8. S14' is used instead of S14, S15' is used instead of S15 and S16' is used instead of S16.

At S1, CPU 21 issues a write RQ to transmission control unit 23. The description below is the same as S1 to S7 in the description of the write RQ operation according to the first embodiment. In the write operation of the second embodiment, the processing of S8 according to the first embodiment is not carried out, instead the processing of S8' is performed.

If the write RQ of a PU, which includes bus competition mediating element 34, is in such a state in which it can be issued to the bus as a result of mediation by bus competition mediating element 34 at S8', bus management element 49 receives information that the RQ is a write RQ and bus busy management element 491 confirms the use condition of the bus data cycle. Because the bus is operated in a pipeline system, write data corresponding to write RQ can be transmitted to the bus after the latency after the write RQ is issued to the bus. However, if there are data cycles that are not used before the latency, it is possible to transmit (data to the bus during that unused data cycle as soon as the write RQ is issued to the bus. In this situation, information representing the time for transmission of write data, namely information representing the time for using the data cycle is registered in bus busy management element 491. FIG. 15 shows changes of register value in bus busy management element 491 (see S8 of the write RQ operation according to the first embodiment and S9 of the read RQ operation according to the second embodiment).

The operation of the entire bus timing register is the same as the write RQ operation of the first embodiment. As for the operation of the valid timing register, if a 1 set in the entire bus timing register is valid in a PU, which includes the valid timing register, at time T+1, as in the first embodiment, a 1 is set at the same time. If it is not valid, a 0 is set.

S9 to S13 are the same as S9 to S13 and are described in the write operation in the first embodiment.

In the write operation of the second embodiment, the processing of S14 of the first embodiment is not performed, instead the processing of S14' is performed.

At S14', bus management element 49 receives information that the RQ received by the MM from MM control element 48 is a write RQ, a time of the data cycle in which the write data of the RQ uses the bus is registered in bus busy management element 491 as in S8'. In the write operation of the second embodiment, the processing of S15 of the first embodiment is not performed, instead the processing of S15' is performed.

At S15', bus connection element 35 of PU 11 which issued the write RQ transmits data held in data holding element 351 and at S3, transmits write data of the write RQ to the bus data cycle registered in bus busy management element 491 through the bus.

In the write operation according to the second embodiment, the processing of S16 of the first embodiment is performed at S16'.

At S16', MM connection element 41 receives an instruction that write data of write RQ will be sent from bus management element 49 to bus data cycle registered in bus busy management element 491 and receives data existing in the data cycle from the bus according to the instruction from RQ identifying element 411. S17 to S18 are same as the write operation according to the first embodiment. Then, a series of the write RQ operation ends.

In FIG. 9, which is the timing chart of the write RQ operation, the second embodiment is the same as the first embodiment and conventional art (see a description of the timing chart of the write RQ of the first embodiment).

Figure 2A:
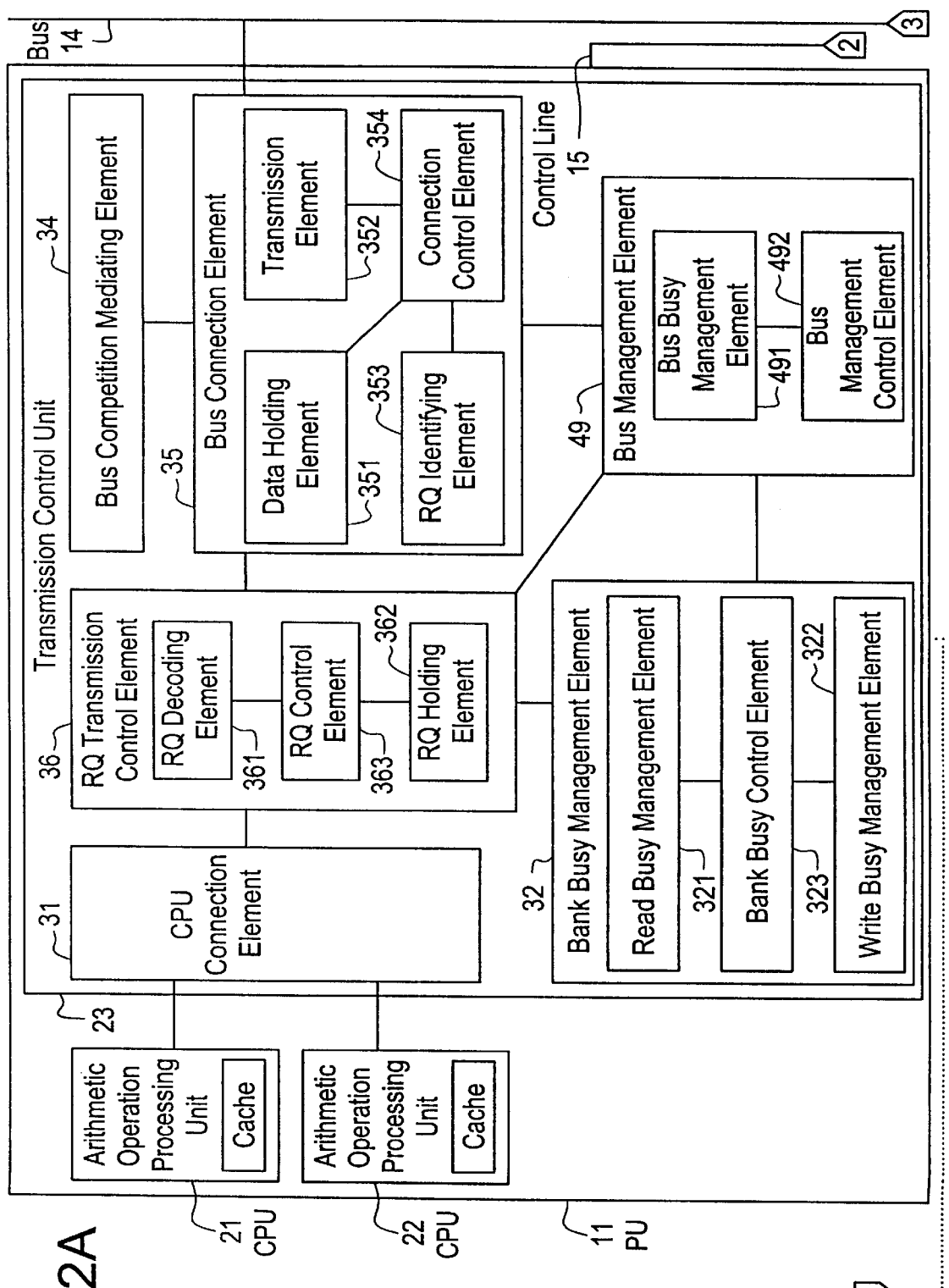
FIG. 2 is a diagram of a second embodiment of the present invention.
Figure 2B:
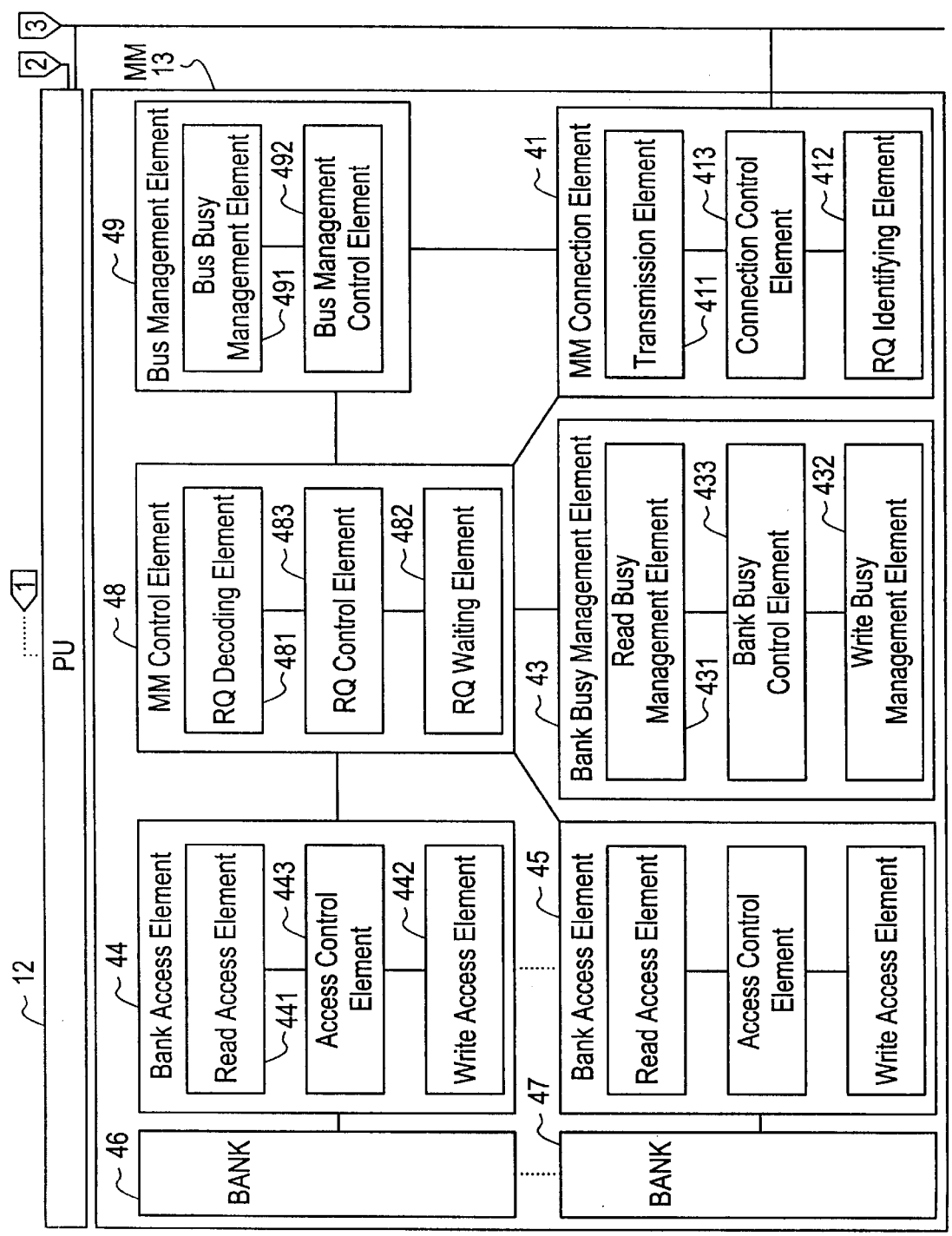

Next, the C write operation of the second embodiment will be described. An operation in which CPU 21 issues a read RQ to bank 46, the RQ dirty-hits a cache line existing in PU 12 and PU 12 issues a write RQ to PU 11 will be described with reference to FIG. 5. Regarding the C write operation of the second embodiment, descriptions of the read operation and write operation for the C write operation of the first embodiment are used for descriptions of the read operation and write operation of the second embodiment. FIG. 5 is a flow chart of the C write RQ operation. In which a flow chart and description of the read RQ operation of FIG. 3 and a flow chart and description of the write RQ operation of FIG. 4 are used. For the description, designations and reference numerals of FIG. 2 are used. However, if a description of the write RQ operation is used, write RQ is replaced with C write RQ.

Upon the write RQ operation, the result of the operation is as shown in FIG. 10 because of the difference between control by the mode and control by the valid timing register. Therefore, this is the same as the first embodiment.

As described above, according to the second embodiment, since a register, which synchronizes between the PUs and MM 13 at the time of issuing the RQ for the write operation to the memory, is provided, the interval between the RQ and the data on the bus can be reduced to be less than the latency. As a result, when the write RQ or C write RQ are issued, the waiting time until CPU, which should be supplied with data depending on a RQ, receives data after it receives the RQ can be reduced to be less than the latency. Therefore, a drop of the performance due to the waiting time can be suppressed.

While this invention has been described in conjunction with the preferred embodiments described above. It will now readily be possible for those skilled in the art to put this invention into practice using various other manners.

What is claimed is:

1. An information processing apparatus comprising:
    a bus having latency;
    a first element which sends out a request to said bus, wherein said request includes information indicating a time that data corresponding to said request exists on said bus,
    and sends out said data to said bus at the time indicated by said information; and
    a second element which receives said request, identifies said time which said data exists on said bus,
    and receives said data at the identified time.

2. The information processing apparatus as claimed in claim 1, wherein said time, which said information indicates, starts when said request is sent out, and ends when said latency is over.

3. The information processing apparatus as claimed in claim 1,
    wherein said request includes a write request; and
    wherein said information indicates that data corresponding to said write request exists on said bus at an earliest time when said bus is available.

4. The information processing apparatus as claimed in claim 3, wherein said information has n (n is an integer that is more than 1) bits when said latency includes (n+1) cycles.

5. The information processing apparatus as claimed in claim 4, wherein said bits of said information corresponds to cycles, respectively, and each of said bits indicates whether or not said data exists on said bus.

6. An information processing apparatus comprising:
    a bus having latency;
    a first means for sending out a request to said bus, wherein said request includes information indicating a time that data corresponding to said request exists on said bus,
    and sending out said data to said bus at the time indicated by said information; and
    a second means for receiving said request, identifying said time which said data exists on said bus, and
    receiving said data at the identified time.

7. The information processing apparatus as claimed in claim 6, wherein said time, which said information indicates, starts when said request is sent out, and ends when said latency is over.

8. The information processing apparatus as claimed in claim 6,
    wherein said request includes a write request; and
    wherein said information indicates that data corresponding to said write request exists on said bus at an earliest time when said bus is available.

9. The information processing apparatus as claimed in claim 8, wherein said information has n (n is an integer that is more than 1) bits when said latency includes (n+1) cycles.

10. The information processing apparatus as claimed in claim 9, wherein said bits of said information corresponds to cycles, respectively, and each of said bits indicates whether or not said data exists on said bus.

11. An information processing method used in an information processing apparatus which has a bus having latency, said method comprising:
    sending out a request to said bus, wherein said request includes information indicating a time when data corresponding to said request exists on said bus;
    sending out said data to said bus at the time indicated by said information;
    receiving said request and identifying said time which said data exists on said bus; and
    receiving said data at the time which said receiving and said identifying step identifies.

12. The information processing method as claimed in claim 11, wherein said time, which said information indicates, starts when said request is sent out, and ends when said latency is over.

13. The information processing method as claimed in claim 11,
    wherein said request includes a write request; and
    wherein said information indicates that data corresponding to said write request exists on said bus at an earliest time when said bus is available.

14. The information processing method as claimed in claim 13, wherein said information has n (n is an integer that is more than 1) bits when said latency includes (n+1) cycles.

15. The information processing method as claimed in claim 14, wherein said bits of said information corresponds to cycles, respectively, and loach of said bits indicates whether or not said data exists on said bus.

16. An information processing apparatus comprising:
    a processing element which outputs a request;
    a bus on which data exists after a predetermined time from an issuance of said request; and
    a storage element which receives said data,
    wherein said processing element which controls an interval for transmitting data and sends out the data to said bus based on said interval.

17. The information processing apparatus as claimed in claim 16, wherein said processing element controls said interval in accordance with an occupation of said bus.

18. The information processing apparatus as claimed in claim 16, wherein said processing element produces information indicating a time when said data exists on said bus.

19. The information processing apparatus as claimed in claim 18,
    wherein said processing element comprises a first register which stores said information; and
    wherein said storage element comprises a second register which stores said information.

20. The information processing apparatus as claimed in claim 16,
    wherein said processing element comprises a register which stores information showing a time when said processing element sends out data to said bus.

* * * * *

UNITED STATES PATENT AND TRADEMARK OFFICE
CERTIFICATE OF CORRECTION

PATENT NO. : 6,266,777 B1
DATED : July 24, 2001
INVENTOR(S) : Satoshi Jinguji

It is certified that error appears in the above-identified patent and that said Letters Patent is hereby corrected as shown below:

Column 2,
Line 4, delete "IT" insert -- 17 --;
Line 26, delete "RE" insert -- RQ --

Column 3,
Line 64, delete "te" insert -- the --;
Line 67, delete "invenS1" insert -- invention --

Column 4,
Line 18, "appar;3tus" insert -- apparatus --

Column 6,
Line 45, delete "48" insert -- 46 --;
Line 49, delete "wafting" insert -- waiting --

Column 7,
Line 23, delete "e,(ample" insert -- example --

Column 8,
Line 34, delete "recivers" insert -- receives --;
Line 63, delete "RAS"

Column 9,
Line 38, delete "tine" insert -- the --

Column 10,
Line 54, delete "addres5s" insert -- address --;
Line 58, delete "2" insert -- a --

Column 11,
Line 53, delete "RO" insert -- RQ --;
Line 54, delete "57" insert -- S7 --;
Line 61, delete "fc)r" insert -- for --;
Line 65, delete "far" insert -- for --

UNITED STATES PATENT AND TRADEMARK OFFICE
CERTIFICATE OF CORRECTION

PATENT NO.  : 6,266,777 B1
DATED       : July 24, 2001
INVENTOR(S) : Satoshi Jinguji It is certified that error appears in the above-identified patent and that said Letters Patent is hereby corrected as shown below:

<u>Column 12,</u>
Line 16, "d3ta" insert -- data --

Signed and Sealed this

Thirtieth Day of April, 2002

Attest:

Attesting Officer

JAMES E. ROGAN
Director of the United States Patent and Trademark Office